(12) United States Patent
Jhatakia et al.

(10) Patent No.: US 8,842,384 B2
(45) Date of Patent: Sep. 23, 2014

(54) DATA ADAPTERS FOR STORAGE TAPE ANALYTICS SYSTEM

(71) Applicant: Oracle International Corporation, Redwood City, CA (US)

(72) Inventors: Jitesh Bakul Jhatakia, Superior, CO (US); Quentin Lee Rainsbury, Royalla (AU); Cathleen Susan Wharton, Superior, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/068,128

(22) Filed: Oct. 31, 2013

(65) Prior Publication Data

US 2014/0055880 A1 Feb. 27, 2014

Related U.S. Application Data

(63) Continuation-in-part of application No. 13/627,058, filed on Sep. 26, 2012, now Pat. No. 8,730,778.

(60) Provisional application No. 61/541,372, filed on Sep. 30, 2011.

(51) Int. Cl.
*G11B 27/36* (2006.01)
*B05D 5/06* (2006.01)

(52) U.S. Cl.
USPC .................................. 360/31; 427/162

(58) Field of Classification Search
None
See application file for complete search history.

(56) References Cited

U.S. PATENT DOCUMENTS

| | | | | |
|---|---|---|---|---|
| 6,460,151 B1* | 10/2002 | Warwick et al. | ............ | 714/718 |
| 6,725,394 B1* | 4/2004 | Bolt | ............ | 714/5.11 |
| 2005/0044451 A1* | 2/2005 | Fry et al. | ............ | 714/38 |
| 2005/0052772 A1* | 3/2005 | Barbian et al. | ............ | 360/69 |
| 2006/0126211 A1* | 6/2006 | Sasaki | ............ | 360/74.4 |
| 2008/0250264 A1* | 10/2008 | Hourselt et al. | ............ | 714/2 |
| 2009/0030652 A1* | 1/2009 | Greco et al. | ............ | 702/182 |
| 2010/0185793 A1* | 7/2010 | Muroyama | ............ | 710/34 |
| 2012/0271888 A1* | 10/2012 | Haustein et al. | ............ | 709/204 |
| 2012/0287528 A1* | 11/2012 | Thompson et al. | ............ | 360/48 |

\* cited by examiner

*Primary Examiner* — Paul Huber
(74) *Attorney, Agent, or Firm* — Marsh Fischmann & Breyfogle LLP; Kent A. Lembke

(57) ABSTRACT

A system for monitoring and analyzing operation of a tape infrastructure. The system includes a plurality of real and virtual tape libraries each including a plurality of tape drives and tape media. The system includes a server linked to the tape library. On the server, a storage tape analytics application is provided that functions to extract raw data sets from the tape library corresponding to operations of the tape library. The data pertains to use of the drives and media during data storage operations and data about the activities of the real or virtual tape libraries. The analytics application stores the extracted data sets in an analytics database. The analytics application provides a user interface for viewing data in the analytics database, e.g., a GUI operable by monitoring personnel to view and interact with the gathered and processed tape operations monitoring data to provide historical and user-driven analysis of data for an entire data center.

25 Claims, 19 Drawing Sheets

US 8,842,384 B2

DATA ADAPTERS FOR STORAGE TAPE ANALYTICS SYSTEM

CROSS-REFERENCE TO RELATED APPLICATIONS

This application is a continuation-in-part of U.S. patent application Ser. No. 13/627,058, filed Sep. 26, 2012, which claims the benefit of U.S. Provisional Application No. 61/541,372, filed Sep. 30, 2011, both of which are incorporated herein by reference in its entirety.

BACKGROUND

1. Field of the Description

The present description relates to magnetic tape data storage and, in particular, to methods and systems for monitoring operation of a tape-based data storage system including gathering data from tape libraries and including determining and predicting health of media and tape drives and other storage system components.

2. Relevant Background

For decades, magnetic tape data storage has offered cost and storage density advantages over many other data storage technologies including disk storage. A typical medium to large-sized data center will deploy both tape and disk storage to complement each other and with the tape storage often used for backup and archival data storage. Due to the increased need for securely storing data for long periods of time and due to the low cost of tape, it is likely that tape-based data storage will continue to be utilized and its use will only expand for the foreseeable future.

Briefly, magnetic tape data storage uses digital recording on to magnetic tape to store digital information, and the tape is packaged in cartridges and cassettes (i.e., the storage media or simply "media"). The device that performs writing and reading of data is a tape drive, and tape drives are often installed within robotic tape libraries, which may be quite large and hold thousands of cartridges to provide a tremendous amount of data storage (e.g., each tape may hold several terabytes of uncompressed data).

An ongoing challenge, though, for the data storage industry is how to manage and monitor data centers, and, particularly, how to better monitor tape storage media and devices. For example, customers demand that data be kept safely and with lower tape administration costs. In this regard, the customers desire solutions that efficiently and proactively manage data center tape operations including solutions that provide failure analysis for problematic or suspect media and drives. Further, customers demand data collection regarding operations to be non-invasive, and the management solution should provide recommended corrective actions. Data storage customers also want their investment in tape technologies to be preserved and data integrity maintained. This may involve monitoring tape capacities in volumes and/or libraries, flagging media to be migrated, and advising on resource rebalancing. Customers also desire a management solution that provides an effective and useful user interface to the collected tape operations data and reporting of detected problems or issues.

Unfortunately, existing tape data storage management solutions and systems have not met all of these needs or even fully addressed customer dissatisfiers. For example, existing management tools typically only collect and report historical data, and it can be very difficult after the fact or a problem with tape operations occurs to determine whether a particular drive or piece of media was the cause of a failure. This can lead to cartridges or other media being needlessly replaced or a tape drive being removed for repair or even replaced without verification of a fault. Some systems manage media lifecycles, but this typically only involves tracking the age or overall use of media to provide warnings when a tape or other media is potentially nearing the end of its useful life to allow a customer to remove the media. Existing systems also often only provide alerts after a failure or problem has occurred, e.g., alert when already in a crisis mode of operation. Further, reporting is limited to predefined reports that make assumptions regarding what information likely will be important to a customer and provide the customer with no or little ability to design a report or select data provided to them by the tape operations management system.

The data storage industry's current tape monitoring approach may be categorized as falling within one of three categories, with each having issues or problems limiting their widespread use or adoption. First, tape monitoring may involve a datapath breach approach. Such an approach only works in a storage area network (SAN) environment, and it also introduces drive availability risk and exposes data to vendors. Second, tape monitoring may involve a media vendor-lock in approach, but this results in reporting only being available if the media in a data center or tape library was sourced from a particular vendor. Third, tape monitoring may be limited to a single library within a data center, and this may be undesirable as each library has to launch its own monitoring application and the data is not aggregated for analysis or for reporting to the customer or operator of the data center.

Hence, there remains a need for improved systems and methods (e.g., software products) for providing customers with timely information to efficiently manage data center tape operations. Preferably, the information would include tape analytics that would allow proactive management of the tape operations rather than merely reactive management based on vendor-selected sets of historic data.

SUMMARY

To address the above and other issues, a method and system is provided for monitoring and analyzing operations of a tape infrastructure as may be found in a data center performing tape-based data storage. For example, a data storage system may include a server or appliance running a storage tape analytics (STA) application or software suite/tool that implements a data warehouse approach to monitoring a tape infrastructure. The STA application receives or gathers raw data from a number of data sources that may include a library management mainframe and one, two, or more tape libraries. The library data may be transmitted using a data transport mechanism such as via SNMP (Simple Network Management Protocol) or any other useful data transport such as a direct connection Ethernet to drives or an API to connect to a mainframe or other open systems that also support library or tape system control or related operations to send or retrieve data to those systems.

The raw data may include data pertaining to operations of the library as well as its components including tape drives and tape media (or cartridges) such as mount records, I/O or other records indicating what occurred while media was mounted in a drive, and dismount records. The data is not tied to a single library or drive but will, instead, include data on multiple libraries (when applicable) and numerous drives and media (which may be of differing types and fabricated by differing manufacturers). The raw data may be real time data collected during ongoing operations of a system of tape libraries that is used to build up a historical picture of tape library operations. In other cases, though, historical data may be mined or gathered to analyze past operations of a tape library or system of such libraries. This historical data may be gathered from various input sources such as from a library management mainframe or the like.

The STA application applies the warehouse approach by utilizing a database to stage or store the received data records in staging tables, to clean up or transform the data into useful standard or normalized form(s), and to summarize the collected operations data. The STA application includes a user interface module for providing a user with an interface (e.g., a browser-based graphical user interface (GUI)), and the STA application makes no or few assumptions about which data will be pertinent to the user. Instead, the user is able to interact with the tape operations data in the database via the GUI to view and process all of the gathered data, which may include historical data as well as current operating data to facilitate trending-type analyses. The user is able to customize views and screens in the GUI, and these may be saved for later use by that user or for sharing with other monitoring personnel.

The STA application includes an analytics subsystem that may perform the summarization and also may perform algorithms and computations on the raw and summarized data to determine the current health of various components of the tape infrastructure. For example, drive health indicators may be provided for all the drives in each library of a data center in a view of the GUI. An alerting module of the STA application may provide alerts to one or more recipients based on monitored operating conditions such as when an operating parameter of a tape library crosses a predefined (user-defined) threshold. The alerts may also be provided in views in the GUI and stored in the STA database for later viewing or processing. Further, the STA analytics subsystem may use algorithms and computations to determine or predict when a component of the tape infrastructure may have operational problems (or reduced health). For example, the STA analytics subsystem may predict failure of a tape media or a drive so that they may be proactively maintained/replaced or tape infrastructure operations may be altered to limit or avoid use of these components.

More particularly, a data storage system is provided for monitoring and analyzing operation of a tape infrastructure or tape storage in a data center. The system includes a tape library including a plurality of tape drives and a plurality of tape media for use in the tape drives. The system further includes a server (or appliance) communicatively linked to the tape library and a tape analytics database in memory (within or accessible by the server). On the server, a storage tape analytics application is provided that functions to extract raw data sets from the tape library corresponding to operations of the tape library. The operational data may pertain to use of the tape drives and the tape media during data storage in the tape library (e.g., mount and dismount records and I/O records for when the tape media was in a drive). The storage tape analytics application stores the extracted data sets in the tape analytics database, e.g., in staging tables. Further, the storage tape analytics application provides a user interface for viewing data in the tape analytics database, e.g., a GUI operable by monitoring personnel to view and interact with the gathered and processed tape operations monitoring data.

The data storage system is not tied to a single library. Hence, the system may include a second tape library linked to the server. In such an implementation (two or more libraries being monitored such as in a tape enterprise data center with multiple libraries), the storage tape analytics application extracts data sets from the second tape library, stores the extracted data sets for the second tape library, and provides access to all the data sets in the tape analytics database. In this way, the user interface is operable to concurrently access operations data for all the tape libraries and the drives and the tape media in the tape libraries.

In some embodiments, the storage tape analytics application processes the extracted data sets to determine current and historical health of the tape library and its drives and tape media. Further, it acts to predict a failure of one of the tape drives or tape media occurring at a future time (e.g., a failure may be predicted when its likelihood or a suspicion level rises above a certain preset value). In some exemplary but not limiting cases, the extracting of the data sets includes receiving Simple Network Management Protocol (SNMP) data directly from the tape library, e.g., the data transport mechanism is SNMP, and the STA application may utilize SNMP loaders to stage the data and then use SNMP transformers to normalize the raw data for use by a data analytics subsystem.

The data storage system may also include a library management system (an application running outside the libraries) that operates to manage operations of the tape library. In such embodiments, the storage tape analytics application may receive data corresponding to operations of the tape library from a data collection agent provided on the library management system. Then, the storage tape analytics application stores the received data in the tape analytics database for access via the user interface (e.g., the data from the two differing data sources are normalized for concurrent processing including summarization, which may be useful as the two sources may provide at least some sets of differing data useful in monitoring tape operations).

The user interface is generated, in some cases, based on user input that defines a subset of the data in the tape analytics database to be presented on a screen of the user interface (or how the presented data is arranged). The subset of the data may include historical data for the tape library such that the health of the tape library is viewable over a user-defined time period and is not limited to only current health or operational data but may, instead, be used for determining causes of a failure or change in tape-based data storage operations. The user interface may be dynamically derived based on the available data sets. For example, data provided by a mainframe virtual view of a library versus a physical view of the library may yield different capabilities and options available in the user interface. The user interface typically is able to be defined dynamically (on-the-fly) based on what systems that STA application is connected to and receiving data from (e.g., not just, in some cases, plugging into a library or system of libraries and showing what is there).

While the storage tape analytics (STA) application may process and analyze operational data, it may also provide an analysis of control activities. In other words, the processed operational raw data may not just be I/O from a tape library, but the STA application may also gather, load, and transform data related to actual control operations such as library audits or robotic movements. The STA application may also be integrated with backup (e.g., Oracle OSB or the like) and other tape management applications (e.g., Oracle ACSLS, Oracle HSC/ELS, and so on). The STA application may provide information to these applications based on its data gathering, loading, and transformation and analysis processes so that these applications may better optimize behavior. For example, if the STA application notifies these applications that a tape drive or a tape cartridge is bad, these applications can ensure that they do not use them when doing backup operations.

BRIEF DESCRIPTION OF THE DRAWINGS

FIG. 17 provides a flow chart of a tape operations monitoring and analysis method that may be performed during operations of a data storage system described herein that includes and uses an STA application such as the STA applications shown in FIGS. 1-4 or the like.

DETAILED DESCRIPTION

Figure 1:
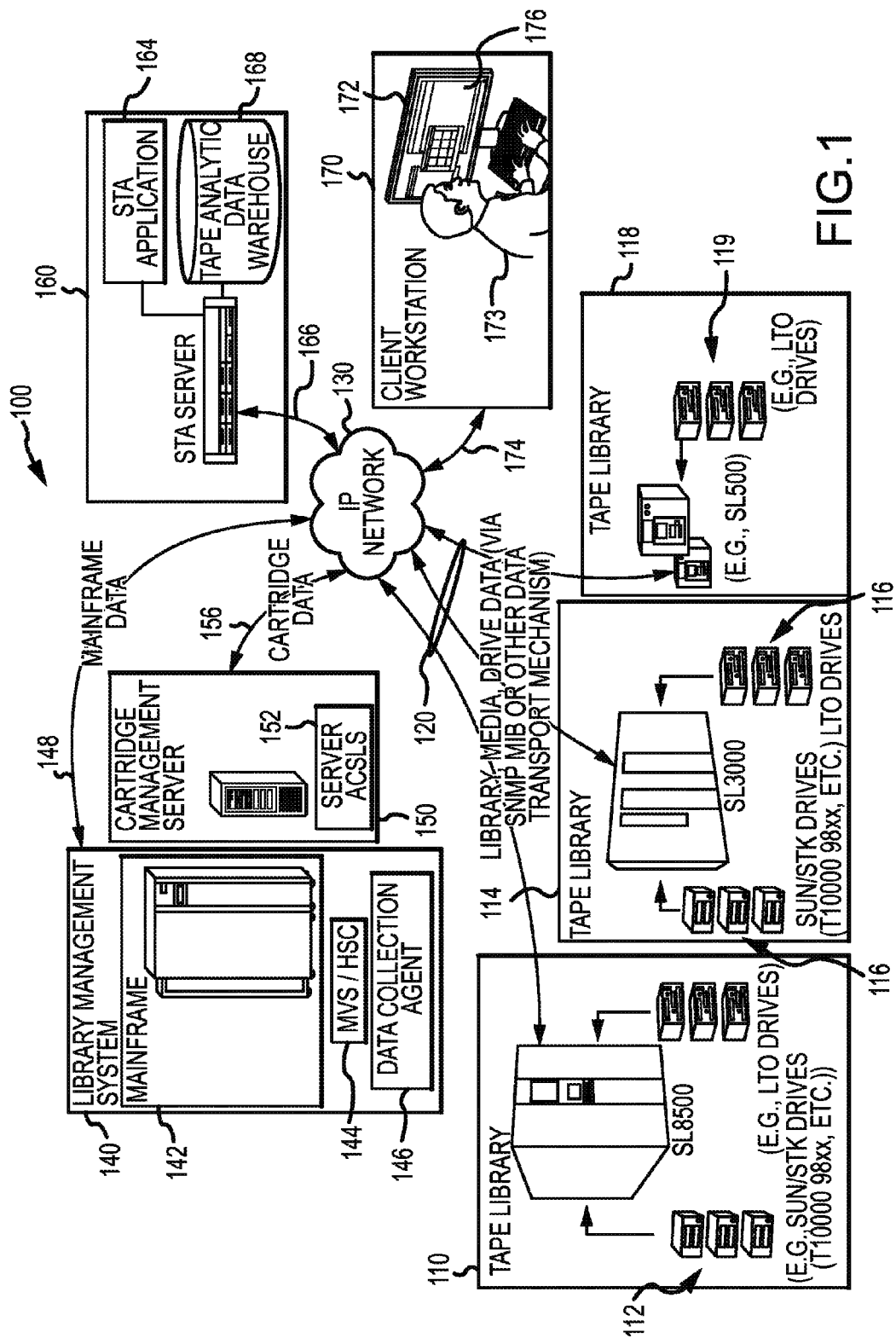
FIG. 1 is a functional block or schematic illustration of a data storage system implementing a storage tape analytics (STA) tool of the present description to monitor and analyze operations of tape-based data storage in the system.

Briefly, a tape analytics system and method is described that is built up around a storage tape analytics (STA) software suite, application, or product that may be run or executed upon a customer's (or tape operation monitor's) computer system such as on a server that is communicatively linked with a tape-based data storage system or data center (e.g., automated tape libraries, tape drives, and tape media). The STA application is an integrated management solution for the tape infrastructure of the data center that functions to capture data about the tape infrastructure, and this data is warehoused in a database that can be accessed in user-defined or default interfaces, alerts, and reports. The data gathered may include data about tape mounts, dismounts, I/O that occurs while tapes are mounted, errors during I/O or robotic processes, and the status of all the tape infrastructure components.

The STA application provides a customer or other monitor of a tape infrastructure with tape business insight to efficiently and proactively manage data center tape operations. As will become clear from the following description, the STA application can provide a user a number of advantages. For example, lower tape total cost of ownership (TCO) may be achieved via increased tape system reliability and a single pane-of-glass for monitoring tape operations (e.g., a graphical user interface (GUI) provided by the STA application on a client device). The STA application also provides simplified tape management through the following: (1) proactive tape media and drive health management; (2) customizable alerts and reporting; (3) functions and features supporting novice and expert users; and (4) analytics to help customers/managers make decisions about the tape hardware and media in their managed environment or data center. Increased tape performance may be achieved as the STA application provides a database of library movements, tools to optimize existing hardware, and insights into drive balancing solutions. The STA application presents a scalable and flexible tape management solution as it may support monitoring of thousands of drives and even larger numbers of tape media while typically also being interoperable with existing and future hardware. The STA application may be deployed with a simple deployment model such as standalone software.

Prior to turning to an exemplary data storage system utilizing an STA application, it may be useful to further explain how an STA application may address top problems and reasons of dissatisfaction of data center or tape storage managers or customers. It is desirable to keep data safe and to lower tape administration costs. In this regard, the STA application provides a comprehensive set of analytics to predict drive and media failures. Failure analysis is also provided for problematic or suspect media and drives as well as generating recommended corrective actions. The STA application further may provide alerts and workflow management for critical situations. Data collection is non-invasive with the STA application providing a low-touch approach for the analysis of tape operations. In some cases, the STA application provides integration with leading edge tape capabilities with DIV (Data Integrity Verification).

Tape operation managers also wish to preserve their investment in tape technologies. With this in mind, the STA application monitors tape capacity of current volumes and also predicts capacity for future growth. The STA application may also flag media to be migrated and advise on resource rebalancing according to identified usage patterns. Tape capacity may be mapped to public tape technology roadmaps and to planned tape generational migrations. Further, the STA application may monitor tape partition usage and support various business metrics that can be defined by the customer.

Significantly, the STA application also provides a "single pane of glass" for tape intelligence. Specifically, the STA application can provide a single UI for statistics across tape libraries, tape media, tape drives, and host applications. It can also correlate data that previously would have to have been accessed (if available at all) through separate applications. The STA application provides a flexible systemic view instead of silo-only statistical views. The STA application also can provide predefined, custom, and what-if queries across data sets for enhanced tape analytics. Management is provided at scale and across a hybrid set of tape solutions including logical groupings (which may be defined or set by the customer or user of the STA application).

The STA application is a scalable solution to tape analytics and management that is able to grow in both physical scope and in terms of types and numbers of devices that can be monitored. Its open and extensible architecture permits the inclusion of increased functionality in a seamless, non-disruptive manner. Support for new hardware types and facilities may be easily added to the STA application. The STA application exposes a rich graphical interface via a web browser, for example, to act as the interface between a user and the server upon which the STA application is provided or running.

The STA application will typically not require explicit installation but will, instead, be provided via a web interface displayed on the client's workstation. The STA application may use industry standard technologies such the JAVA™ technology so that it is feature-full and robust and can be used on a variety of different end-user workstations and personal computers with no (or little) further installation requirements. An install may go on a virtual box in addition to a dedicated server. In some embodiments, the STA application will generally be delivered as either a software product that customers/users may install onto an existing server (e.g., a Solaris server, a Linux server, or a server with another operating system) or as part of an appliance where all necessary components are pre-installed on the appliance, which is then communicatively linked to the monitored tape infrastructure as part of its installation at the customer's/user's site.

Turning now to the figures, FIG. 1 illustrates a data storage system 100 that may implement the monitoring and analytics described herein to provide enhanced management of a tape infrastructure. In this regard, the system 100 includes a number of tape libraries 110, 114, 118 each with a number of tape drives 112, 116, 119. Tape media (e.g., cartridges) is automatically mounted and dismounted from these drives 112, 116, 119 although particular media is not shown in FIG. 1. Exemplary libraries and drives are shown in FIG. 1, but the system 100 may be implemented with nearly any type of library, drives, and tape media (e.g., not limited to those of a particular manufacturer in the data storage industry). During operation of the data storage system 100, library, media, and drive data 120 is transported via a data transport mechanism (e.g., SNMP, an Ethernet port, SCSI, or the like) over a network (e.g., a local area network (LAN), storage area network (SAN), or the like) to an STA server 160. For example, the data 120 may include mount records, records of what occurred while a tape media was in a drive, and a dismount record. Also, it should be noted that the data 120 is for a full tape storage infrastructure, here shown as including 3 libraries 110, 114, 118 but could include more, and is not limited to monitoring data from a single drive or library.

The data storage system 100 further includes a library management system 140 and a cartridge management server 150. For example, the library management system 140 may include a mainframe or other computer device running an operating system and management software applications 144, with the operating system shown to be MVS provided by IBM and the management software being Host Software Component (HSC) provided by Oracle, but other operating systems and library management software may be utilized in the data storage system 100. A data collection agent 146 is provided in the data storage system 100 to act to collect library management-specific (e.g., HSC-specific) data 148 that is transmitted via IP network 130 to the STA server 160. The cartridge management server 150 may run one or more applications 152, such as Automated Cartridge System Library Software (ACSLS), to control an automated cartridge system, and cartridge management-specific (e.g., ACSLS-specific) data 156 is provided by the application 152 over IP network 130 to the STA server 160 for use in analytics of tape operations in the tape libraries 110, 114, 118.

Significantly, the data storage system 100 includes the STA server 160 that runs or executes the STA application 164 to manage collection and storage of the data 120, 148, 156 from all the tape analytics data sources in system 100 in the tape analytics data warehouse 168 (e.g., a database(s) in memory of server 160 or accessible by server 160) and to perform analytics functions as described herein. Briefly, the STA application 164 provides a data warehouse approach to management of a tape infrastructure, and this involves gathering/receiving a wide variety of data 166 (which includes data 120, 148, 156 from all sources in system 100), storing and processing this data in the database 168, performing analytics on this data such as predicting health issues of the media or drives in libraries 110, 114, 118, and presenting out all the data available in the database 168 including the predictive health attributes of media/drives as shown at 174 to a user 173 operating a client node or workstation 170. The client workstation 170 includes a monitor/display device 172 that is operable (such as with a browser) to allow the user 173 to view and process the data 174 via a user interface 176, which is described in more detail below. The STA application 164 is adapted to allow customer-driven analysis of the data 168 and may include reporting tools, customizable UIs 176, and other devices to enable the user/customer 173 to drive analysis of the tape infrastructure in the data storage system 100.

The tape monitoring approach shown in system 100 may be considered a direct library communication approach, which differs from prior monitoring techniques (such as the data path breach approach, the media vendor lock-in approach, and single library approach). The system 100 provides monitoring with data path protection and media vendor flexibility. Also, a single monitoring application 164 may be used for multiple library environments 110, 114, 118.

In general, the STA application may be deployed into a customer's/user's environment on a network (such as network 130). The tape analytics system, either a STA appliance or the STA software 164 installed onto a server 160 belonging to a user/customer, is provided connectivity to tape libraries 110, 114, 118 and to one or more workstations 170 where STA users may use a browser-based GUI 176 to interact with the tape analytics system. A number of transport mechanisms may be used to collect the data 120 from the libraries 110, 114, 118. In one useful implementation, the communication link uses SNMP for interactions between the libraries 110, 114, 118 and the STA application 164. The communications with the client workstation 170 may be provided with a link using http and https or the like to run a browser-based GUI 176. Communications to the mainframe 142 and the management software application 144 and data collection agent 146 may use a protocol (e.g., a proprietary or a non-proprietary protocol) over TCP/IP sockets or the like. The system 100 typically is fully under the control of the user 173.

The STA application 164 may be thought of as being provided in a technologies or software stack. From top to bottom, this stack may include: applications; middleware; a database; an operating system; a virtual machine; a server; and storage. The application is the STA application 164 and the data collection agent 146, both of which may be provided in nearly any programming language with one exemplary implementation using Java J2EE for the STA application 164 and assembly language for the data collector 146 (e.g., IBM assembly language for an SMF data adapter on mainframe 142). The applications may also include analytics such as Crystal Ball (CB) from Oracle for tape analysis. In some cases, the STA application 164 may be written in Java and use Oracle's MySQL, JDMK, ADF 11g, and Weblogic 11g software products, but, again, the description is not limited to such an implementation.

The middleware may be used, in part, to provide a browser-based UI 176 and may include WebLogic from Oracle or a similar application and/or web server software. The database is used to implement the tape analytics data warehouse 168 and may utilize MySQL or similar database management technologies. The operating system may be Linux, Solaris, or any other useful operating system provided by Oracle or other OS providers. The virtual machine may be implemented using Virtual Box or the like. The server also may take numerous forms to practice the system 100 such as a Sun Fire server from Oracle or the like. The storage in the technology stack is provided by a tape storage implementation as shown with tape libraries 110, 114, 118 with tape drives 112, 116, 119. Again, the hardware supported and used in system 100 may be widely varied to practice the tape analytics and monitoring described herein and may take the form shown in FIG. 1. For example, the libraries 110, 114, 118 may be Oracle's StorageTek libraries (e.g., the SL8500, SL3000, SL500, or similar or future libraries), and the drives 112, 116, 119 may be Oracle's StorageTek drives (and media) (e.g., the T10000 A/B/C, T9840 C/D) or LTO 3/4/5 from HP and IBM.

Figure 2:
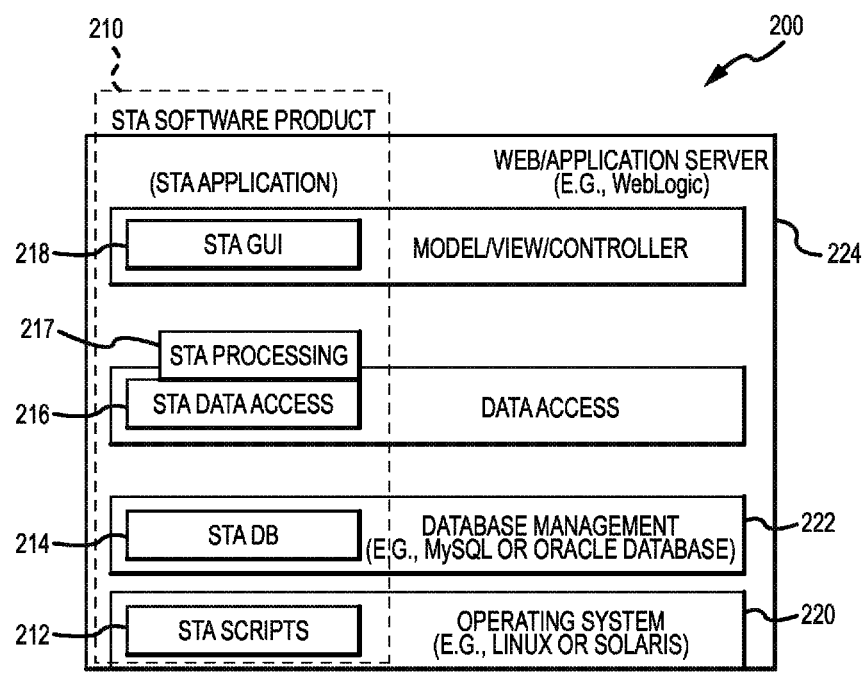
FIG. 2 provides a diagram of key software components or technologies that may be provided in an implementation of a STA product or an STA application provided on an appliance or installed on a customer's/user's server.

FIG. 2 provides a diagram of a software stack 200 with software components or technologies that may be provided in an implementation of an STA product or an STA application 210 provided on an appliance or installed on a customer's/user's server. At the bottom of the stack 200, an operating system 220 such as Linux, Solaris, or the like is provided, and the STA application 210 may include STA scripts 212 to perform portions of the STA functionality described herein. In the stack 200, a database (e.g., MySQL, an Oracle database, or the like) 222 and a web and/or application server (e.g., Web Logic or another useful technology/product) 224 are also provided. A STA database module or component 214 is provided in the STA application 210 to manage and provide the data warehouse/STA database.

The stack 200 may include a MVC (model, view, controller) architecture or similar technologies as part of the web/application server 224, and business intelligence such as STA data access 216 with intelligence subroutines such as STA processing 217 is used to provide the business component of the STA application 210 (such as data loaders, data transformers, data summarizers, data analyzers, and alert/report generators). The MVC provides a number of functions that are well known by those skilled in the arts and are shown as high-level groups of functionality in the stack 200 of FIG. 2. The MVC business components, including the STA data access and processing components 216, 217, provide an interface into the database 222. Above the MVC business components, MVC provides three layers defined in the MVC (model, view, controller) architecture, and the STA GUI 218 is implemented using these three layers. The STA processing subroutines (Java enterprise Java beans, for example) 217 can directly use the database interfaces provided by the MVC business components implementing STA data access 216. Part of the functionality of these routines 217 is implemented using the application modules that may be part of the MVC business components. The STA application 210 may include a database schema for the database 214, 222 and may have shell scripts 212 that are used to install and run the STA system.

Figure 3:
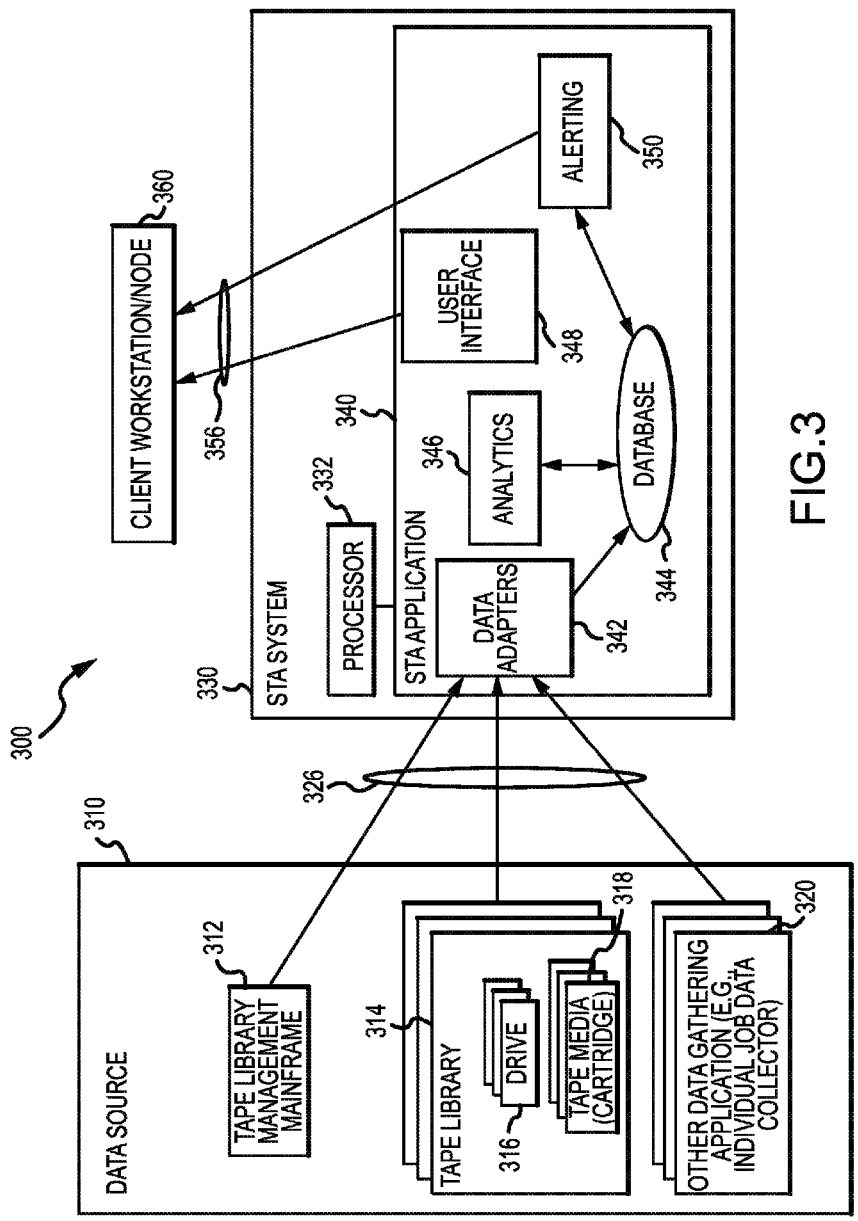
FIG. 3 is a functional block diagram of the architecture of an exemplary data storage system implementing the storage tape analytics of the present description.

FIG. 3 illustrates a functional block diagram of the architecture of a data storage system 300 implementing the storage tape analytics described herein. The system 300 includes a data source 310, an STA system 330, and one or more client workstations or mobile nodes/client devices 360. The STA system 330 receives or gathers raw data 326 from the data source 310, warehouses the data in raw and processed/analyzed form in a database 344, and presents the data 356 to the user of the client workstation/node 360. The data source 310 may include nearly any data source useful for monitoring and analyzing operation of a tape-based data storage infrastructure. As shown, the source 310 includes mainframe data from a mainframe 312 performing tape library management functions and also other data gathering applications 320, such as applications run or executed by a server to collect data on individual jobs or functions occurring within a tape library 314. Further, the data source 310 includes one, two, three, or more tape libraries 314, and the tape library data may include data pertaining to the tape drives 316, tape media or cartridges 318, and other library components such as robots. The raw data or records from a tape library may include, but is not restricted to, mount records, records of I/O or what occurred while a cartridge 318 was mounted in a drive 316, and dismount records.

The STA system 330 (e.g., a server connected via a communications network to the data sources 310 and client workstation 360) includes a processor(s) 332 that functions to execute code or run software to provide the STA application 340 and perform its methods/processes. The STA application 340 has an architecture made up of the following five major components: data adapters 342, a database/data warehouse 344 in memory, analytics modules 346, a user interface module 348, and alerting module 350. Briefly, the database 344 holds all data and system configuration information. The user interface module 348 generates a browser-based graphical user interface viewable and manipulated by the user of workstation/mobile device 360, and the user interface presents tabular and graphical information and performs all configurations of the STA application 340. The STA application 340 further includes a set of adapters or adapter modules 342 that gathers or receives data 326 from external data sources 310 and transforms it into a standardized form. The alerting mechanism 350 provides notification to the user via workstation/mobile node 360 or other communication methods when significant events (which may be defined by the user) are detected by the STA application 340. With this overview in mind, it may now be useful to describe each component of the STA application in greater detail.

The database 344 may be considered the heart of the STA application 340. It includes a set of modules that contain related types of data. Two primary modules are the "tape system model" and the "tape warehouse." The tape system model contains a representation of the libraries 314, media 318, drives 316, and other entities that exist in the tape infrastructure being monitored/managed with the STA application 340. The term "model" is used since this data is only a representation of the real world, and the tape system model holds not only the current state of the world but also its history. The tape warehouse module contains detailed information about what is happening in the tape infrastructure. This starts with the raw data 326 such as that provided when a tape is mounted or dismounted or when an error is detected. The facts stored in the warehouse/database 344 also include derived results that are calculated by the analytics or analytical subsystem 346 of the STA application 340. These derived facts may span a range of complexity from simple calculations based on a few numbers from a specific event to long term analytical evaluations.

In addition to the tape system model and the warehouse module, the database 344 may also hold the information needed by the STA application for operations. This may include configuration information needed to attach to the external data sources, data staging areas used by the data loaders (provided by adapters 342) to process the external data 326, information needed to produce reports and graphs provided by the user interface module 348, alerts and rules needed by the alerting module 350 to detect and process alerts, and any other persistent information needed by the STA application 340.

The human interface to the STA application 340 is its graphical user interface provided by the user interface module 348. The human interface may be implemented using web browser technology to avoid use of a separately installed component. The GUI may provide authentication (login) and authorization (permissions) functions to control access to the stored data provided by the database 344 and system functions. The user interface 348 provides the ability to define and view a variety of reports. Generally, the reports may include tabular and/or graphical displays that show some subset of the facts available in the database 344. Various pre-defined (by the STA application 340 or by the user of workstation 360) reports and displays are available to view both the raw data and the analytical results. These reports can be customized, for example, by filtering the data shown based on either the model data (e.g., to a specific set of the libraries 314) or by the dimensions of the fact data (e.g., specific time ranges, after or before a particular event occurred, data for a particular building or business unit, and so on). Additionally, the GUI provided by interface module 348 may provide administrative functions useful to manage the STA application 340. These may include configuring data sources 310, managing user access to the STA application 340 (e.g., to configure LDAP servers or the like), configuring alerts, servicing the STA application 340, and other functions.

The STA application 340 collects and uses data 326 from various external sources 310. These sources 310 may include tape libraries 314 and a mainframe HSC or other tape management system 312. Further, other sources may be provided or added to the system 300 as shown at 320. The data loaders or adapters 342 acquire the data 326 by either pulling it from the external source 310 or by receiving this data 326 as messages from the external source 310. Either or both mechanisms may be used for a specific source within the set of sources 310. The loaders 342 are responsible for parsing the input data 326, performing any transformations needed and inserting the data into the raw fact tables and model tables of the database 344.

The loaders 342 may work via a multi-step process such as the following exemplary two-step process. The first step may be to acquire the input data 326, parse it, and insert it into staging tables in database 344 (or in other areas of memory accessible by the STA application 340). The second step may be to perform any transformations needed to put the data into the standard structure used in the tape system model and fact module or tape warehouse. The parsed input data may be retained in the staging tables indefinitely to allow reprocessing of the data, which may be very useful in many cases such as should issues be found in the data or in the transformations.

The analytics subsystem 346 may include routines/programs that perform a series of calculations on the raw facts data. These calculations may be predetermined and/or pre-defined in some cases. For example, one routine or program may implement a "suspicion algorithm" that analyzes the data from the mount and dismount records to determine drive and media health. The calculations may further include aggregation operations to produce periodic (e.g., daily, monthly, or another time period) summaries. The calculations, of course, may be driven by the reports desired/provided by the user interface module 348. The analytics modules 346 work by retrieving the raw facts and existing analytics facts from the database 344, performing the calculations, and then storing the results back into the database 344. The analytics calculations may be triggered by an event, such as loading data or based on a schedule.

Alerts generated by the alerting module 350 represent significant events in the tape environment of data storage system 300 that are detected by the STA application 340. An alert, as managed by the STA application 340, may be a direct result of something that happens in the tape environment, such as the report of an error by a tape library 314. Significantly, alerts generated by alerting module 350 may also be derived by the STA application 340 from the input data 326 and/or data calculated by analytics 346. For example, a suspicion value that exceeds a threshold may result in an alert, with this alert being a predictive or proactive alert indicating that operational status or health of a component of a tape infrastructure (such as a tape drive, a tape media, or the like) will degrade in the near future and its use should be halted or maintenance/replacement should soon be performed.

Alerts may be created by an alert detection subcomponent of the alerting subsystem/module 350. This component may have rules for examining the tape system model and facts/data in the warehouse module of database 344 and then for generating alerts when appropriate. This may be a rules-based subsystem that understands a few rules such as filtering and thresholds and applies user-specified or default criteria and its rules to create alerts. Once generated, alerts may also be stored in the database 344. Screens may be available via user interface 348 to display the generated alerts at workstation 360. In many cases, an alert refers to a specific entity in the user's environment, such as a tape drive 316 or a tape cartridge or media 318. Alerts may also have a state that can be "new," "acknowledged," "dismissed," and/or other states.

A second portion of the alert subsystem is alert notification. Alerts may have a severity level, which may drive the communication path(s) used by alerting module 350 in providing the alert to a user (e.g., via an e-mail, via a text message or voice message to a wireless client device, in a report in a user interface, and so on). Alerts may result in notifications with a GUI provided by user interface 348 and/or in e-mails being sent to users of the STA application 340. A newly detected alert may result in notification appearing on the screen of any active GUI. This function is part of the user interface 348 and may simply be a matter of a GUI or interface module 348 actively polling the database 344 for new alerts. The e-mail function may be a background task initiated after an alert is detected.

Figure 4:
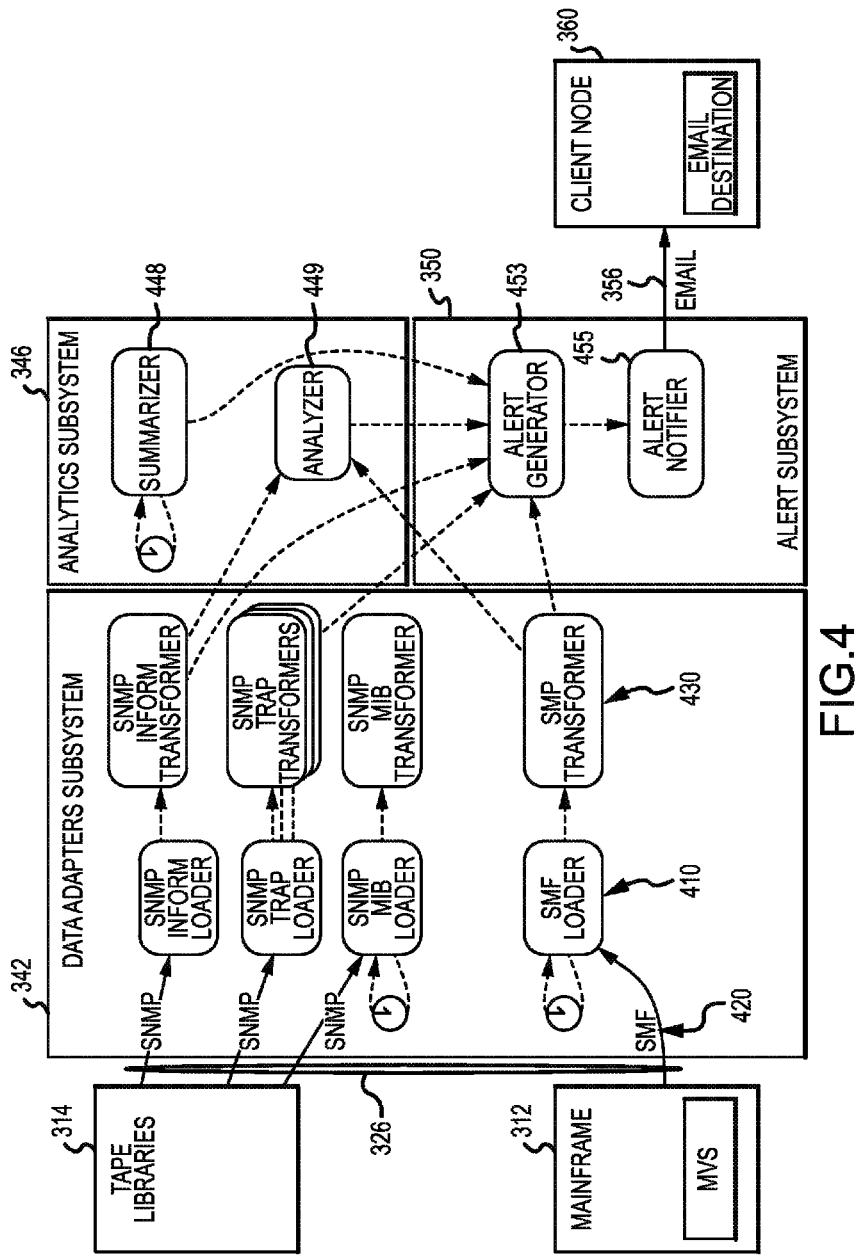
FIG. 4 is functional block diagram providing an implementation view of an STA architecture with further detail on components or features of the data adapters subsystem, the analytics subsystem, and the alert subsystem of the STA application of FIG. 3.

The components of the STA application 340 shown in FIG. 3 may be implemented using a series of Java beans or similar program devices. For example, FIG. 4 illustrates portions of the system 300 of FIG. 3 showing more details of the components that may be used to implement the functionality described for the STA application 340 within system 300. For example, the data adapters subsystem 342 may include a set of loaders 410 for collecting and receiving data 326 from the management mainframe 312 and from tape libraries 314, and these may be implemented as Java beans or the like that are timed routines that execute periodically or be message driven that execute as a result of an incoming message 326. The transport mechanism 420 for data 326 may be based on a protocol such as SNMP (Simple Network Management Protocol), as shown for libraries 314, and the loaders 410 may include data loaders configured for such a data transport protocol (e.g., an SNMP inform loader, an SNMP trap loader, and SNMP MIB loader). The mainframe 312 may, in some cases, utilize a proprietary data transport mechanism 420 such as SMF when the mainframe 312 implements MVS to manage the libraries 314. The received raw data may then be passed from the loaders 410 to a series of data transformers 430 adapted for processing the types of data provided by each loader 410.

The analytics subsystem 346 may include one or more analyzer routines/processes 449 for further processing the transformed tape operations data, and the output of the analyzer subroutines 449 will be stored in the data warehouse of the database and also will be provided to the alert subsystem 350 as shown. The analytics subsystem 346 also includes a summarizer module/routine 448 (e.g., a timer bean(s)) that periodically summarizes the transformed data, with the summarized data being stored in the database and also, when appropriate, being provided to the alert subsystem 350. The alert subsystem 350 includes an alert generator 453 for determining when an alert needs to be provided and to then generate the alert, and the generated alert is provided to an alert notifier 455 for communication 356 of the alert to a user such as via an e-mail message to an e-mail destination for receipt/viewing with a client device or node 360.

With regard to the architectural principles of the STA application, it can be seen that it is database focused, data is to be retained, history is maintained, data is warehoused, and the STA application is message based. First, the STA application is database focused, which means that to the extent practical all data gathered, transformed, and analyzed is held in the STA database. Here, "data" is any information received by the STA application, generated by the STA application, and input by a user. As a result, flat files and configuration files are typically not used. Being database focused also means that knowledge is held in the database when possible. Developers are sometimes faced with a choice of building knowledge into the code or placing it in the database. Where practical, the choice when implementing an STA application is to place knowledge into the database rather than embedding it into code. However, the function of parsing an input record apart may be better handled in code, but, in contrast, the knowledge needed for converting between codes found in that input record and STA meanings typically are placed in the database.

Second, data is retained or held rather than discarded. For example, when a result is computed or data is received, the STA application acts to hold onto or retain the data in its least-processed form. Then, as additional results are calculated, both the input data and the calculated results are retained by the STA application in the database. Third, the STA application maintains not only the current state of the tape infrastructure but also its history. This impacts the data structures because the infrastructure changes over time. Both current and historical information is stored in the same tables. This allows queries to be the same whether searching for current or past records. A consequence of this approach, though, is that queries may be more complex as queries that only want current data have to screen out past data.

Fourth, the STA application is fundamentally a warehouse that captures data about a user's tape infrastructure. The STA database may be structured as a star schema to the extent possible. Because the STA application may provide navigation using the familiar hardware hierarchy of tape libraries, the STA database may use a hybrid model, e.g., the majority of the data is in star tables while the hardware hierarchy is in tables that hang off the dimension tables of the star. Fifth, the STA application is message based. The STA application has a number of different functions including loading incoming data into the database, parsing apart the incoming data, and performing computations on the data. The STA application may use a message-based approach to handling these different functions. Once one function has completed its work, it may send out a message to be received and processed by another function of the STA application.

At this point in the description, it may be useful to describe the STA application and data storage systems implementing this software tool by providing several functional walkthroughs, e.g., outlines of the workflow a user would use to perform various functions with the STA application. The functional walkthroughs are provided in the following outlines: (1) a user model; (2) data viewing; (3) data collection and processing; (4) alerting; (5) data source configuration; and (6) installation.

With regard to a user model, there are several different types of users that may use the STA application or a data storage system with such a program/tool provided for monitoring tape storage. A basic user may want to see a simple view of the tape infrastructure using the STA user interface. Such a user may use predefined views provided as default views in the STA application or may use customized views created by other users. A basic user may navigate from screen to screen as they view different aspects of their tape environment and investigate problems. An analytical user may spend more time performing detailed investigations of their tape infrastructure. While this type of user may use the STA application's pre-defined data views, they will likely customize these views (which may then be used again by them or others). This user may export data to other tools for further analysis (e.g., Crystal Ball or similar tools that may be useful for performing ad hoc investigations of their data). A report-viewing user may make use of reports defined by basic or analytical users. Such reports may be e-mailed directly to this type of user such as in the form of pdf or similar documents. An administrator may be a user that is responsible for the management of the STA application, and such management may include software or appliance installation, configuring data sources, performing backups of the STA database, and installing new versions of software.

With regard to data viewing, viewing the data elements collected by the STA application may be considered a core STA function. Data elements may be grouped into "information sets" that gather related elements. Examples of such information sets may include "drive health" and "media health." While the STA application is typically focused on drives and media, it also collects information about tape libraries and their component parts and is capable in some cases of displaying this library and library component information. Data may be displayed in graphical or tabular form, and numerous options are typically provided for selecting the data to be displayed in the user interface, for controlling which specific attributes are displayed, and modifying the appearance of generated and displayed charts.

At this point it may be useful to provide an example of user interface flow. When a user connects to the STA application (e.g., via a browser-based GUI or the like), a "dashboard" view is typically shown to the user on their display or monitor of their workstation or client device. The dashboard gives a summary of the status of the overall system, and a more detailed, but typically still summarized, "overview" is available to provide more details. From there, the user can choose to investigate drives, media, libraries, or the various other entities known to and monitored by the STA application. The user can direct the STA application to show a table of many entities, such as a list of drives, in a "multi view." This data may be summarized by the various attributes in the list into an "aggregate view" or the user may choose to view details about an individual device (e.g., a tape drive) in a "single view" or the user may view a graph of some attribute of the device (e.g., the drive) over time in a "chart view." The STA application provides great flexibility in terms of what data is shown and how the data is presented.

Exemplary flow through the GUI may include the following steps. First, the user may login and once login is validated be presented a dashboard of their monitored tape-based data storage system. The user may notice that there is a problem with one of the tape drives in one of the libraries. The user may respond by choosing an aggregate view of drive health versus drive type, and this may result in the user determining that a number of a particular type of drive are in a "faulty" or other state (a multi view of drives). The user may then decide to look more closely at the first drive in the list and bring up a single view of that particular drive.

From this point, the user may want to see the recent activity of the drive and choose, for example, to see a time ordered multi view of the exchanges performed by that particular faulty drive. Then, if no obvious problem is noted, the user may select a line chart of throughput for the drive, where the user may notice a recent exchange with throughput lower than other drives. Then, the user may jump back to the multi view of the exchanges so that they can select the tape media in that exchange by clicking on the volume serial number ("volser"), for example, in the list of exchanges. This brings up a single view of that particular tape in the user interface. From here, the user may request a list of exchanges involving that tape and then a line graph of the associated throughput. The user may then notice via the user interface-provided data that the tape media has consistently been producing lower throughput than typical for that type of tape media regardless of which drive the tape was used in the library. The user may then respond by freezing the tape media in their application, leaving it available for reading but blocking any further writes to that problematic tape media.

The STA application provides considerable flexibility about the appearance of most of these display screens in the user interface. The tables shown in a multi view, for example, can be sorted. Selection criteria may be applied to limit the entities (e.g., drives) shown. Columns can be reordered and hidden. Similarly, for aggregate views, selection criteria may be applied to limit the data shown. The user may control which attributes are used for columns and rows and which attribute is used for the cells and how that data item is summarized (e.g., count, sum, average, or the like). The STA application provides the user the ability to save a screen once it has been tailored to the user's preferences or user-provided design. Once a user has adjusted the content and appearance of a screen, it can be given a name and saved, and a saved view may be made available to other users or reused by the saving user as the view can be retrieved at any later time. Generally, the view will not retrieve the same data at later dates since new data is continuously being added to the STA database, and the same view, when retrieved at a later point in time, will show the latest data. A saved view typically only shows a fixed set of results when the view is configured with a specific date or date/time range.

With regard to data collection and processing, the STA application or system collects data from external sources. For example, data may be collected directly from tape libraries (e.g., SNMP data or data using other data transport mechanisms) and from a library management system (e.g., SMF data from a mainframe), and the actions of the STA application may be similar for these two data sources. Data may be initially acquired by the STA application by either it being sent by the data source or it being retrieved from the data source. For mainframe data (e.g., MVS SMF data or the like), an agent ("the data collection agent") may be installed on the mainframe (e.g., on the MVS system or the like). The STA application may periodically request data from the data collection agent, and the data collection agent may retrieve data from the library management system (e.g., from MVS and from the HSC) and send it back to the STA application. Some library data (e.g., SNMP data) may be sent in the form of trap or other data (e.g., for SNMP it may be SNMP Traps and SNMP Informs), and additional data may be retrieved from the libraries (e.g., using SNMP Gets when the data transport mechanism is SNMP).

Once data is received by the STA application, the received data is inserted into staging tables, with these staging tables holding the data in a minimally processed or raw form. Data elements are extracted from the incoming data for the staging tables (e.g., the incoming Traps or MIBs for SNMP). Some data may not require any parsing such as the SNMP Informs and SMF records from the library management mainframe. This allows the STA application to reprocess input records if more information is desired in a future version or if a problem in the data requires special processing in some cases. After loading the data into the staging tables, the STA application acts to transform the staged data into a standardized form and inserts the transformed results into the "raw fact" tables in the STA database. This step may require updating "dimension" tables such as if a move involving a new tape media is received. Once the data is in the raw fact tables, analytic processing is performed. Some calculations are performed as each new record is received, and these are started when new records are inserted into the raw fact tables. Other calculations/analysis are performed periodically (e.g., hourly, daily, and the like), and these are run as time periods pass based on rules specified by the STA application (default periods) or the STA application users (user-specified analysis periods).

With regard to alerting, alerts are typically generated in response to significant events being detected by the STA application. In some implementations, there are at least three sources of alerts including: (1) changes in the top level conditions of libraries; (2) SNMP Traps or similar data being received from the libraries; and (3) an input or calculated value provided by the analytics module being determined to exceed a threshold value. When the STA application detects an event condition, it creates an alert record that is stored in the STA database. The STA application may then send notification about the alert to a user of the STA application (or one that has subscribed for particular alerts). Each alert may have a severity level, and notification may vary in practice including transmitting e-mail messages, communicating voice/audio messages to a wired or wireless user device, providing a text message, and the like.

Regarding alert configuration, library top level condition and other settings, such as SNMP Traps, may require no configuration. However, threshold alerts may require that the user specify a variable to monitor and the threshold for that monitored variable, with such configuration being performed via the user interface in some embodiments. Once set up, the STA application, e.g., with the alert subsystem or module, may check any new record in the database that contains the specified variable and may create an alert when the variable is determined to exceed (or fall below if so specified) the threshold. Users may also configure notification rules that are used to specify an alert type and/or severity level and provide a recipient for the alert (e.g., an e-mail address, a cell phone number, or the like). Each time a new alert is created it may be compared to the alert notification rules. If the alert meets the type and severity criteria set in the notification rules, the alert is communicated to the specified recipient (e.g., an e-mail alert is sent to an e-mail address).

Now, turning to data source configuration, the STA data sources may have to be configured in the STA application and, in some cases, in the data source before the data will be provided to the STA application. For example, the STA application may use a number of SNMP data sources such as the tape libraries themselves (although other transport mechanisms may be used). SNMP data sources may require configuration in both the libraries and in the STA application. In the STA application/system, the setup may be done using the STA user interface. In each of the tape libraries, the setup may be done using the command line interface or the like. To configure SNMP, the user may choose a username, authorization mechanism, authorization password, privacy mechanism, and a privacy password. The STA application may have an SNMP "engine ID." This is needed in some cases to complete the configuration (and may be displayed in the STA user interface), and the IP addresses of the STA system may also be provided as part of configuration. Once configured, the STA application begins monitoring for SNMP input (e.g., Traps and Informs and may perform the Gets) while each library will start sending Traps and Informs to a configured destination based on the list of Traps/Informs that are specified to be sent (typically, all available Informs and Traps are sent to the STA application).

SMF configuration (or library management system configuration) may involve actions on both the library management system (e.g., the MVS system) and on the STA application system. On the library management system, a data collector agent is installed (e.g., a PTF containing a data collection agent may be provided on the system running HSC or SMC). On the STA application system, a connection may be created to each data collector agent such as via the STA user interface. This may involve specifying the IP address or hostname of the system with the data collector agent, a port number, the MVS or other host name, and whether the target system is running a particular host software (e.g., HSC, SMC, or the like).

With regard to installation, the process will depend on whether the software version or product of the STA application or the appliance version is being installed for a user. If the software-only installation is performed, the STA software is installed onto an existing server or computer device, and the installation can be done by the user or as a professional service. The server need not be dedicated to the STA application, but the server has to have compatible versions of the operating system, web/application server (e.g., Web Logic), and database (e.g., MySQL or the like) already installed on the server. The server further should have network connectivity to the tape libraries, library management system, and any other components/tools that will serve as the data sources for the STA application.

In some embodiments, the STA software is an installable package, such that it may be downloaded from a download site. The STA software may run through an unpack-and-install procedure where the software components are placed into the proper locations on the server and data storage system. The STA application is given the information to be granted access to the database. The user performing the install may specify whether a new database is to be created or if the database already exists (such as after a database restore). If a new database is to be created, the STA application may create the necessary tables, views, and users in the specified database. Once the installation is complete, the data sources are configured as described above, and alert threshold rules, alert notification rules, and summarization rules can be configured.

In other embodiments, the STA application is provided to users via a network-ready appliance. The appliance version of STA may be delivered as a server with the STA application software pre-installed, e.g., a server physically installed in the user's data center or the like with physical network connectivity to the tape libraries, library management systems, and external SSP (in some cases) being provided. Initial configuration of the system may be done, e.g., with a console interface. Then, once sufficient configuration is done to get the STA appliance onto the network, a connection can be made using the web-based interface to complete the configuration. On initial power up, the user may connect to the console via the server console interface, and the user provides IP address information. This is typically sufficient to bring up the appliance and its web-based GUI or user interface. The user may now connect to the web-based GUI and complete the configuration of data sources, alert threshold rules, alert notification rules, and summarization rules.

As discussed above, a key aspect of the STA application (such as applications 164, 210, and 340) is the STA database, which may be implemented as a MySQL, an Oracle, or other database. The STA database holds the data collected and calculated by the STA application as well as the data the STA application uses to operate. In many ways, the STA application functions fundamentally as a data warehouse. The STA application does not directly control the tape infrastructure, but, instead, it gathers information about the tape infrastructure, stores and processes it, and presents the data to end-users. End users may use this information to make decisions about the tape infrastructure and may then make changes or take actions based on the information provided by the STA application.

In some embodiments, the STA application is designed using the "star schema" approach often used in designing data warehouses and online analytical processing. However, since the STA application has to capture information about a user's full tape environment and because the equipment in the user's environment may exist in a hierarchy, the STA application may use a hybrid model. In particular, key facts are captured in a set of warehouse tables and the hierarchy hardware data is captured in a set of normalized model tables, and these two sets of tables intersect.

The STA database (such as database 158, 214/222, or 344 in FIGS. 1-3) may be structured into a series of modules that contain distinct sets of data. These modules may include: (a) a tape system model; (b) a tape system warehouse; (c) SNMP staging (or library data that is minimally processed); (d) SMF staging (or library management information from the management mainframe or the like); (e) transformation tables; (f) analytics tables; (g) alerting tables; (h) localization tables; and (i) STA system tables. Each of these tables is discussed briefly below with more detailed descriptions following for several of these tables.

The tape system model is a series of tables that hold information about the configuration of the user's tape infrastructure. These tables may be organized in a normalized form to allow the STA user interface to navigate through the modeled tape infrastructure. The tape system warehouse is a set of tables that capture information from the mount and dismount events that occur in the user's environment (e.g., in their tape-based data storage system). These tables may be organized in a star schema, and the tables of the tape system warehouse may be used to capture data about exchanges and moves as well as data derived from the exchange and move data (e.g., by the analytics module of the STA application). Moves are individual robotic actions that move a cartridge from one location in a library to another. Exchanges encompass two moves with one being the mounting of a tape media in a drive and the other being the dismounting of the tape media, and exchange data also typically captures the data about the I/O performed while the tape media was mounted in a tape drive. The warehouse tables typically link into the tape system model tables to pick up information about the libraries and their components and organization.

The SNMP staging tables capture the information received as SNMP Traps or Informs and information that is retrieved with SNMP Get operations. These tables contain the SNMP data in a minimally processed form. In some implementations, individual fields (e.g., variable bindings or varbinds) are retrieved from the SNMP data and are directly inserted into the SNMP staging tables. The transformation is done by reading the SNMP data from the staging table, parsing it, normalizing it, and then inserting the resultant (transformed) data into the model tables and warehouse tables of the database catalogue afforded by the STA application. The step of normalization is useful as a single STA instance can monitor multiple types of tape libraries with varying personalities, and one purpose of STA is to provide a notion of uniformity to the end user wherever it is applicable.

The SMF staging tables capture information retrieved from the MVS systems using SMF records and SMF-like records. SMF records are generated by the MVS system and are retrieved by the STA application. The HSC system also generates SMF records. To retrieve configuration data, the STA application queries HSC for the configuration and retrieves this information in records formatted similarly to SMF records (hence, the "SMF-like" label). The SMF staging tables hold these records in raw form. After loading into the SMF staging tables, these records are read, parsed, and transformed and inserted into the tape system model tables and the tape system warehouse tables.

The transformation tables capture the rules for converting from the various input codes (e.g., drive type, media type, and the like) into normalized STA fields. An example of this is the media codes that appear in the incoming records from SNMP and SMF. One input code, such as "LTO4_800W" implies a media family of "LTO," a generation of 4, a native capacity of 800 GB, that is a WORM tape (versus a normal data tape or a cleaning cartridge). This mapping is captured in the transformation tables, and the transformer subroutines (e.g., Java beans or the like) use these tables to decode these codes into their components.

The analytics tables provide the information used to perform the analytical calculations such as tables that contain the directions for calculating periodic summaries. The alerting tables contain the alerts detected by the STA application and the instructions for alert notification. The localization tables contain the localized values to be used when displaying data values that are to be localized. Values such as drive health, which may be "good" or "faulty" may be converted to the user's locale before being output, and the localization tables hold the conversion information. The STA system tables hold persistent data used by the STA application or system itself.

It should be understood that some of the values stored in the STA database are actually enumerations. An example is the drive health variable, which can have values such as, but not limited to, "unknown," "good," "suspect," and "faulty." In database design, these sort of values are often held in lookup tables that have integer indexes, and the integer is used in other tables as a foreign key. Queries would then typically join to the lookup table and "Where" clauses may refer to the lookup table value. Many programming languages provide enumeration types that allow a list of meaningful text values to be defined and used in the code. Some databases, such as MySQL, allow definition of enumeration types while others, such as Oracle 11g, do not, which may prevent use of enumeration features. To address this issue, the data in the database may be stored using short strings rather than integers as is commonly done. This will usually avoid a Join, yet let the code still use meaningful values. Where necessary, a "lookup table" may be created that contains the list of allowed values. These string values may make it easier to look directly in the database and make for simpler and cleaner code but are not the values that will be displayed to users of the STA GUI nor provided in printable reports. Values shown in the GUI and on reports will also typically be localized.

Returning to the tape system model, the STA database may include a tape system model module that maintains a hierarchical view of a user's tape system architecture. This module contains tables that capture the various physical entities and groupings of physical entities present in the real world (e.g., in a data center), and these tables may be normalized in practice. The tables of the tape system model maintain a history of the various entities (such as a library, a tape drive, a tape media, and so on).

Each record in these tables contains a starting date and an end date. The starting date is the date and time when the entity was first seen or data received by the STA application, e.g., the date/time when the STA application first detected an entity being installed or that existed upon STA application loading on a user's server (or installation of an STA appliance). The ending date is the last date the entity was seen (or data received for the entity), and the ending date is NULL if, as far as the STA application can determine, the entity still exists in the data center or tape infrastructure. The STA application may identify an end date when an entity is detected to have new attributes, e.g., a library with a particular serial number may be found to have a new firmware version and this may cause the STA application to set an end date as the old library record is no longer applicable.

A current view of the user's environment or tape infrastructure can be selected by querying records where the end date is null. Because of the hierarchy and the tracking of the history of entities in the tape system model, a change higher up in the hierarchy will propagate into lower levels. In the example from above, when a new record is created for the same physical library as a result of loading new firmware, all the library's subordinates will also require and be provided new records in the STA database.

Figure 5:
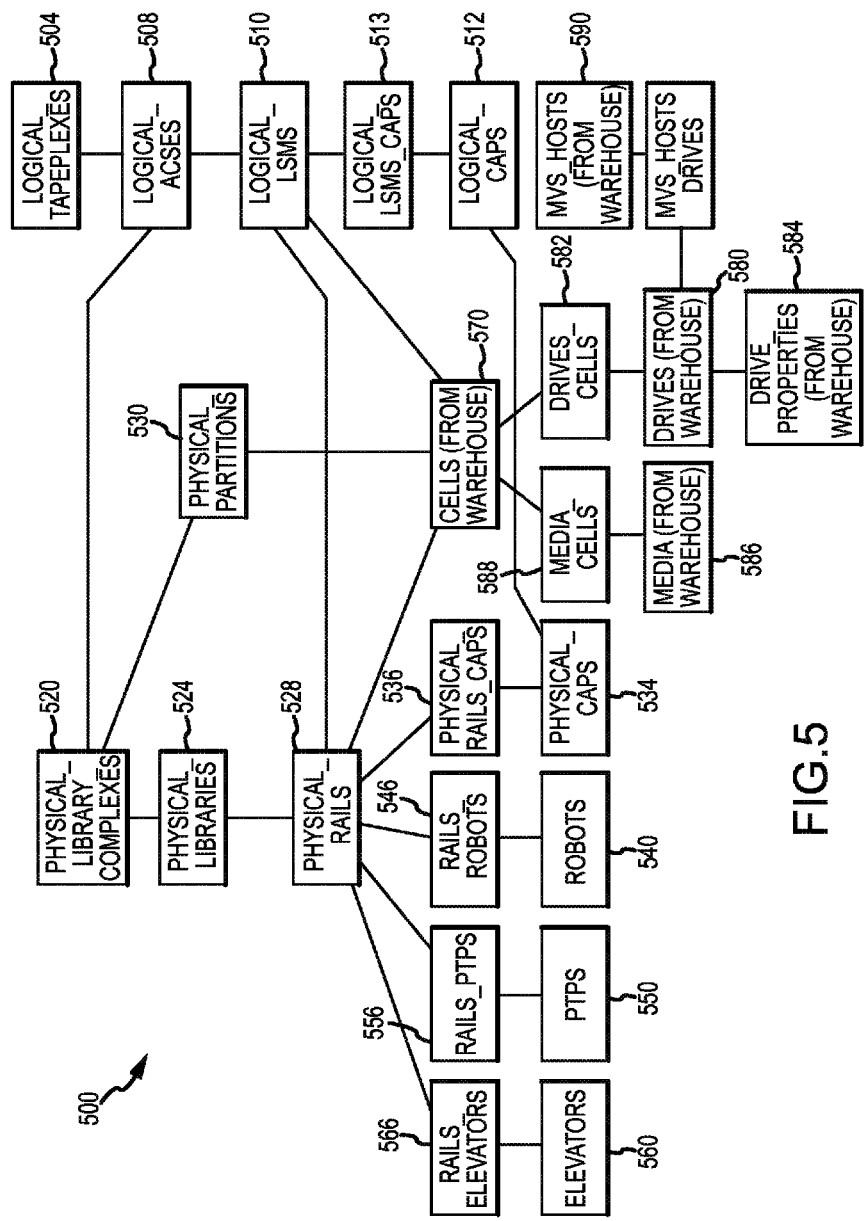
FIG. 5 illustrates an entity-relationship diagram (ERD) of tape system model tables for one exemplary, but not limiting, implementation of an STA application and STA database.

At this point, it may be useful to describe a set of exemplary tables that may be utilized by a tape system model module. FIG. 5 illustrates an entity-relationship diagram (ERD) 500 of the model tables along with a few of the warehouse tables where there is overlap for one exemplary, but not limiting, implementation of the STA application. The tapeplexes 504 represent the HSC or ACSLS instances (or library management component) present in the user's environment or data center. The STA application may initially have no direct connection to ACSLS and may be unable to determine details about tapeplexes 504 that represent ACSLS instances. For MVS HSC systems, though, this information is provided, and these records may be accurately created by the STA application. A tapeplex 504 may contain zero or more ACSs.

The tables include a logical ACS table 508, and an ACS or "automated cartridge system" encompasses a set of drives, media, and storage cells. A characteristic of an ACS is that any tape in the ACS can be moved to any location within the ACS with no human intervention. One tapeplex 504 may contain multiple ACSs 508. An ACS 508 may contain one or more libraries or partitions. An ACS 508 contains libraries if the libraries are not partitioned, but if the actual library is partitioned, then the ACS 508 would contain multiple partitions. In some embodiments, an ACS 508 contains one and only one partition or one or more libraries. This is a consequence of the fact an ACS contains multiple libraries only with certain tape library environments (e.g., the SL8500 environment) and partitioning is not supported in such an environment. Note, neither ACSLS nor HSC explicitly deal with libraries such that as far as both of these products are concerned, ACSs contain one or more LSMs.

In the ERD 500, logical LSM tables 510 are also provided. An LSM is a library or a section of a library. One feature of LSMs is that one robot or a pair of redundant robots can move cartridges anywhere inside the LSM. If a cartridge is moved between LSMs, a pass through-port or elevator is used. Pass-through ports and elevators are robotic devices that move cartridges between LSMs. LSMs 510 contain a number of other entities including storage cells, drives, CAPs (cartridge access ports), and robots. The ERD 500 also includes logical CAPs tables 512, with a logical CAP being a CAP as seen by ACSLS or HSC. Because real libraries can be partitioned and CAPs can be either shared by multiple partitions or dedicated to specific partitions, a physical CAP in the real library may appear as multiple logical CAPs 512 in ACSLS or HSC. The ERD 500 may include a logical LSMs CAPs table 513, which is an association table for mapping logical CAPs to LSMs.

The ERD 500 shows the inclusion of tables 520 for physical library complexes. A string is an interconnected set of libraries that are connected with pass-through ports. In a non-partitioned environment, strings and ACSs are identical. In a partitioned environment, different partitions may be accessed by difference ACSLS or HSC servers and, so, an ACS is only a subset of a string. Physical library tables 524 are provided in the ERD 500, and a library is a physical box containing storage cells, media, drives, robotics, and electronics. Most libraries contain only a single robot or a pair of redundant robots. Thus, a library maps to a single LSM. There are exceptions, though, to this rule, such as the SL8500 where the four rails of the SL8500 are each mapped to an LSM. Tables 528 are provided to represent the rails of a tape system. For example, in an SL8500 library, there are four physically distinct sections. Each has a set of rails that the robots move on, and, so, these four sections are called rails. Other libraries may not have this physical division and, so, are considered to only contain a single rail. A key characteristic of a rail is that a tape can be moved within a rail in a single robotic action.

The tape system model includes physical partitions table 530. Libraries may be divided into logically separate partitions that are represented in table 530. Partitions are presented externally as if they were physically separate libraries. The model shown by ERD 500 also includes a physical CAPs table 534, and a CAP or cartridge access port is used to enter cartridges into the library or to eject cartridges from the library. The physical rails CAPs table 536 maps the rails to the CAPs of a library. A robots table 540 is provided, and a robot in this context may be a robotic device within an LSM that moves tape cartridges. A rails robots table 546 is an associate table used by the STA application to record connections between robots and physical rails.

The ERD 500 shows a PTPs table 550, and a PTP is a pass-through port that is a robotic device used to move a tape cartridge from one LSM to another. A rails PTPs table 556 is provided that is an associate table used by the STA application to record the connections between PTPs and LSMs. In current library designs, each PTP may be connected to two LSMs. The tape system model shown by ERD 500 also includes an elevators table 560. An elevator is a vertically oriented robotic device present in libraries (such as the SL8500 library) that moves cartridges between the rails. Because each rail is treated as an LSM, elevators may be considered as pass-through ports (PTPs) in some situations. However, because they are distinct devices, the STA application may, instead, capture them in the table 560 rather than in table 550. The rails elevators table 566 is an association table used by the STA application to record the connections between elevators and rails, e.g., in the SL8500 library for example each elevator connects four rails.

The tape system model shown by ERD 500 also includes a cells table 570. Each LSM, rail, and partition contains some number of cells. Cells are locations that can hold a tape cartridge or a tape drive. Various types of cells exist, including storage cells that hold cartridges, CAP cells that are in CAPs and are used when entering or ejecting tapes from a library, transport cells that are in robots and are used when a robot is moving a cartridge, PTP cells that are locations in a rail where a PTP or elevator can grab the cartridge, and drive cells. Drive cells may be confusing in that there is a large physical location in a library where the drive can be inserted and then a smaller location in the drive where the cartridge can be inserted, and both are typically identified by the same numbering scheme.

In practice, there are three distinct cell numbering schemes in use. One is the physical address, which is the location of the cell within the physical library. A second is the "HLI address used by ACSLS, HSC, and the HLI (host library interface) protocol. This scheme was devised when the only types of libraries were the Powderhorn libraries and predecessors/variants. The HLI addresses are inadequate to represent the more complex libraries such as the SL8500 and SL3000 libraries. A mapping scheme exists between these two addressing methods. In addition, the SCSI medium (or "media") changer protocol uses "element IDs" to address the cells. The STA records all of these various addresses in some embodiments, though not all may be in use in any particular cell.

The cells table 570 is also part of the warehouse of the STA database. As such, it contains many denormalized fields. Specifically, all the various identifiers from tables such as the LSMs table 510, the libraries table 524, the partitions table 530, and the tapeplexes table 504 are denormalized into the cells table 570. The ERD 500 also includes a drives table 580, and this table represents the physical tape drives present in the tape infrastructure. This table maintains information about drives such as firmware version, and a new record may be created when this information changes. The drives table 580 is also part of the warehouse module and contains denormalized fields based on the hierarchy above it in the tape system model tables as shown in the ERD 500, for example. The drive cells table 582 is an association table that maps between drives and cells. Each record in this table 582 represents a period of time when a specific drive was present in a specific cell. A drive properties table 584 may be provided to collect operational properties of each drive in the tape infrastructure represented by the tape system model.

The tape system model shown by ERD 500 includes a media table 586 that represents tape cartridges (or tape media, media, or tapes). As with the drives table 580 and the cells table 570, the media table 586 is one of the dimension tables for the warehouse and contains a number of denormalized fields. A media cells table 588 is included that is an association table that maps between media and storage cells. Each record in this table 588 represents a period of time when a tape is in a particular storage cell. A new record is created in this table 588 when a tape is placed into a storage cell other than the one where it was most recently located. A new record is not created, typically, if a tape is mounted and then returned to the same cell, but a new record is created if the tape is mounted and then moved to a different cell when it is dismounted.

Further, the ERD 500 shows that the tape system model may include an MVS hosts table 590 that is used to represent hosts. Hosts may be physical machines, virtual machines, or MVS LPARs. This table 590 may contain only hosts that the STA application receives information about and is unlikely to be a complete representation of all machines in the user's or customer's environment or data center. The MVS hosts drives table 596 is provided as an association table that maintains a mapping between hosts and drives. Any particular host may be attached to many drives, and any drive may be attached to multiple hosts, with the table 596 containing this mapping. This information may be derived from information received by the STA application and may not represent all drive/host connections actually present in a user's environment or data center.

Returning now to the tape system warehouse module or simply warehouse, the STA database may include a warehouse that contains the detailed information about the operational activities of the tape libraries and drives. These tables may be organized in some implementations as a star schema. In a star schema, the center of the star is some "fact," and arranged around this fact are a number of "dimension" tables that contain information about the fact. For example, in the STA application data model, an exchange is a key event for which the STA application captures data. An "exchange" in this case encompasses mounting a tape onto a drive, performing I/O on the tape, and then dismounting the tape. The drive captures data about the I/O and the drive performance as the I/O occurs. This data is then passed to the library during the dismount process. The library then passes the data to the STA application, either directly using a transport mechanism such as SNMP and SNMP Informs or indirectly such as by passing the data to HSC which then passes it to the STA application using SMF records.

Figure 6:
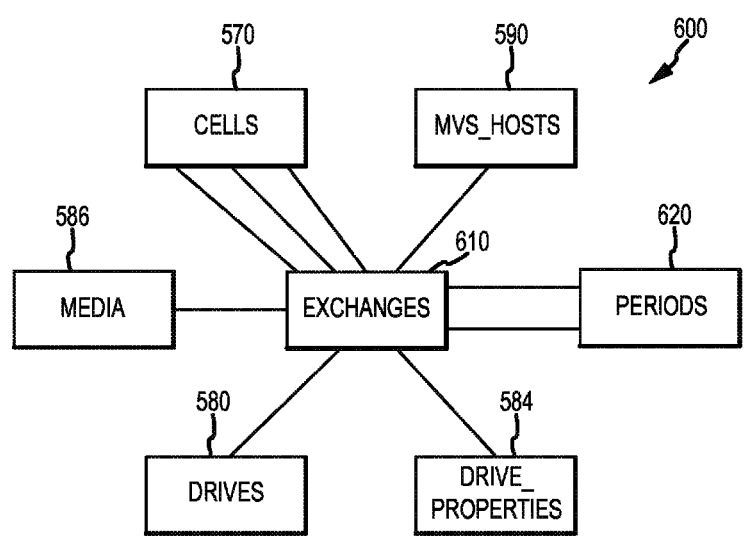
FIG. 6 illustrates a schema for tracking exchanges in the STA database.

FIG. 6 illustrates a diagram 600 of a simplified schema for capturing or tracking data related to exchanges in the warehouse of the STA database. As shown, a table 610 is provided for exchanges as well as tables, as described above with reference to FIG. 5, for cells 570, hosts 590, media 586, drives 580, and drive properties 584. An additional table 620 is used as a dimension, and the periods table 620 contains records for time periods. For the STA application, the smallest period used may be one hour or another useful time period such that there is one record per smallest time period such as one record per hour. These records start at the point in time of the earliest data in the STA database and will periodically be populated to some point in the near future. The periods table 620 may be used to "bucket" the data into time periods to make it more simple to select, for example, all exchanges that completed on a specific day or other range of time.

The exchanges table 610 captures data about each exchange. This includes items such as the start and end date/times for the exchange, the amount of data read and written, read efficiency, write margin, errors, and other information provided by the library and drive. The exchange information may be limited by the interfaces with a high likelihood that it will grow in size over time. The exchanges table 610 may have a number of foreign keys to the dimension tables. The foreign keys to the media table 586 and to the drives table 580 are relatively straightforward as these are the tape and drive involved in the exchange. Further, the hosts 590 is the MVS host involved in the exchange, and this is available only for the MVS environment. There are three foreign keys to the cells table 570 because the tape may start in one cell, be mounted into a drive (which is in some cell), and then be moved to a different cell when dismounted. The two foreign keys to the periods table 620 are for the period when the exchange started and ended.

Figure 7:
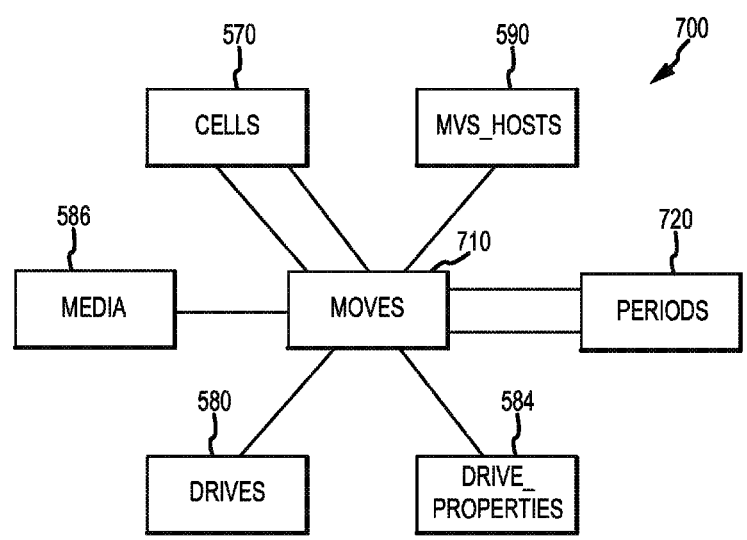
FIG. 7 illustrates a schema that may be used in the STA database to collect data on robotic moves in tape libraries.

FIG. 7 illustrates a diagram 700 of a star schema utilized by the STA application (or database module) for collecting data pertaining to moves in a tape library. A robotic move is the sequence of actions that moves a tape from one location to another. For example, a simple move might involve moving the robot to a specific position, having the robot grab a tape from a location, moving the robot to a different position and having the robot drop off the tape. In contrast, a move may be much more complex and involve several different robots and passing the tape from one LSM to another.

The moves table 710 in the STA application or STA database records these actions. Regardless of the complexity of the actions required, a single record is typically used to capture each move. Data captured for the move is related to the library actions required, such as the time required from the robot(s) and the time the move was queued up waiting for access to the robotics. As shown, the moves table 710 share many of the same dimension tables as exchanges, e.g., the cells table 570, the drives table 580, the drive properties table 584, the media table 586, and the hosts table 590. A periods table 720 is also provided for the moves table 710. A move may only have two foreign keys to the cells table 570 because a move has only a source and a destination. A record in the moves table 710 typically does not have an explicit reference to a drive, though one may be indirectly involved if the source or destination is a drive. Note, moves and exchanges are closely linked. An exchange will have two moves, one to mount the tape and a second to dismount it. However, moves can be done for reasons other than mounting and dismounting tapes. These include entering tapes (e.g., a move from a CAP cell to a storage cell), ejecting tapes (e.g., move from storage to CAP), or a simple move (e.g., storage cell to storage cell).

Figure 8:
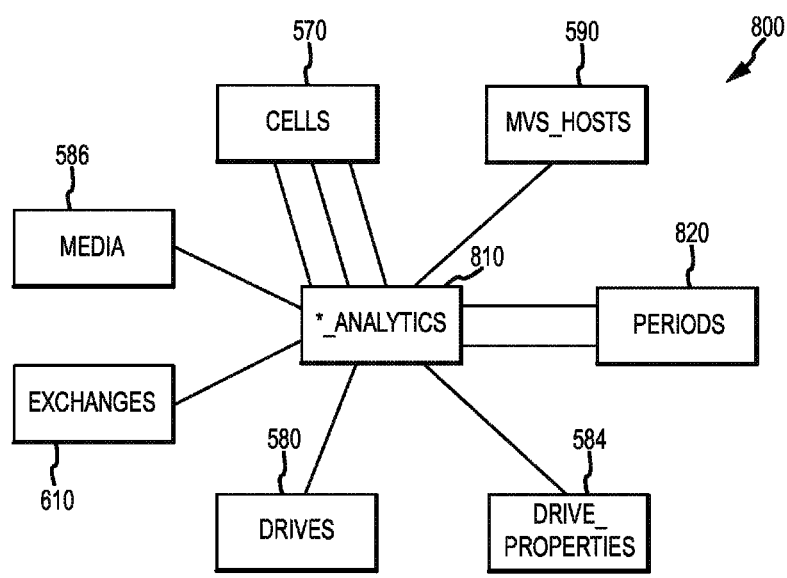
FIG. 8 illustrates a schema that may be used in the STA database to gather and store computed analytics or computed facts/results of analyses.

FIG. 8 illustrates a diagram 800 of a schema used for the analytics tables in the STA database. The analytics tables 810 are fact tables that may be used to store computed facts or results. For example, the computed facts/results may be derived from exchanges data from tables 610. In such an implementation, the tables 810 may include two separate but similar analytics tables for use by the STA application. A drive analytics table may be used to contain results relevant to the drive 580 used in the exchange 610 while a media analytics table may be used to contain results relevant to the tape 586. The relationships from the analytics tables 810 to the dimension tables (including a periods table 820 as well as tables 570, 580, 584, 586, and 590) may be the same as for the exchange table 610, with the addition of a foreign key into the exchanges table 610. While the various foreign keys other than that for exchanges are redundant, their presence simplifies queries and is in keeping with the star schema pattern that may be used for data warehousing in the STA database.

Figure 9:
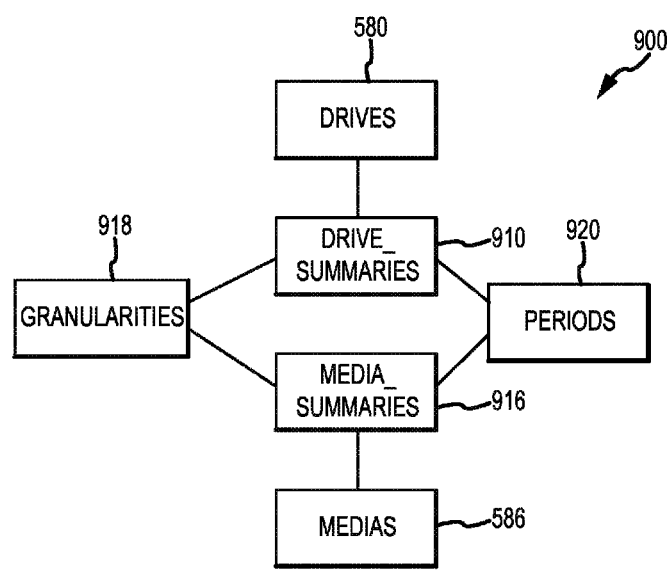
FIG. 9 illustrates a schema that may be used in the STA database to gather data for drives and media that is summarized over time by the STA application.

FIG. 9 illustrates a diagram 900 of a schema used for summaries tables maintained by the STA application in the STA database (or warehouse). The summaries tables 910, 916 contain data for drives 580 and media 586 that is summarized by the STA application (e.g., the analytics module) over some time period 920. The drive summaries table 910 and the media summaries table 916 contain data for drives and media, respectively, and they may contain fields that are similar to the fields in the exchanges and analytics tables 610 and 810. However, while the exchanges and analytics tables 610 and 810 contain data from a single exchange, the summaries tables 910, 916 typically contain data for a longer time period.

The relationships for the summaries tables 910, 916 are simpler than for the analytics and exchanges 610, 810. This reflects the fact that many or no exchanges may have contributed to the summary. Summaries 910, 916 have a relationship to a granularities table 918, which contains entries for hours, days, weeks, and so on. The foreign key to the granularities table 918 gives the length of the time period for the summary 910 or 916. The foreign key to the periods table 920 is for the period record (e.g., an hour) for the start of the time period.

The STA database may also utilize staging tables to hold data as the data loaders receive it from the data sources. The loaders are described below in more detail along with explanation of the data adapter(s) of the STA application. The staging tables may hold the data in a relatively raw form. In other words, each loader may receive or retrieve tape operations data and perform minimal processing on the received data. The transformer module or portion of the data adapter will then read the data from the loader tables, perform any necessary transformations, and then insert the standardized or transformed data into the warehouse and tape system model tables. The staging tables may take the form of SNMP staging tables and SMF staging tables in some embodiments.

Transformation tables may be provided in the database to be used by the transformers of the data adapter to standardize data. One of the steps performed by the transformer (e.g., a transformer bean or the like) in each of the data adapters may be to transform the data from input form into a standardized form. Part of this transformation is to convert from the short codes used in the libraries and related software into meaningful terms. The transformation tables may contain the input version of the various codes along with the standardized values. The transformer then will use the content of the transformation tables to make the mapping from the raw input code into the standardized values.

The database of the STA application may also include alert tables, and the alert tables may include a set of tables that hold information related to alerts. The usage of the alert tables is described in more detail in sections explaining operation of the alerting subsystem of the STA application. The set of alert tables may include an alerts table that contains the alerts generated by the STA application. An alert activities table may be provided that contains the history of each alert, which may include when an action was taken on an alert and which user performed the action. An alert threshold rules table may be included that holds the rules that specify when an alert is to be generated when some drive or media value crosses a threshold. Additionally, the alert tables may include an alert e-mail notification rules table (or other alert communications table) that holds the rules that specify when an e-mail message is sent when an alert is generated.

The STA database is used to retain both current and historical data for a tape infrastructure. That is, not only does the database capture the current tape infrastructure, it also captures the infrastructure as it existed at any point in time in the past. This information is maintained in the same tables regardless of whether it is the most current information or older information, which allows the STA application to maintain a continuous history of the tape infrastructure. Because characteristics of devices can change over time, the STA application has many records for one physical device. For example, one of the attributes of a tape drive is its firmware version. When the firmware for a drive is updated, the STA application creates a new record in the model drives table for that drive. Unchanged characteristics, like a serial number, are the same as in the previous record, and the changed characteristics are placed in the new record.

Begin and end data are typically kept in each record so as to allow the STA application to provide a continuous history for each device and to show the exact parameters in effect at any point in time. When a change occurs and a new record is created, the ending date/time for the old record and the beginning time for the new record are set. Ideally, these will be set to the actual time of the change if the STA application has the correct time, but, if not, the STA application may use the data and time when it detects the change as the end time for the old record and the begin time for the new record.

The changes preferably propagate through the hierarchy of records in the STA database. In the above example, not only will a new model drive record be created for the updated drive but also a new model drive cells record (see attached figures) will be created to link the new drive record to its proper cell. When a change occurs higher in the hierarchy, the effects are more dramatic. For example, a change in the firmware version of a library may require new records be created for all the dependent records. The need to create new records stops when the process reaches an association table. For example, with reference to the attached figures, when the library firmware changes, new cells records are created to link up to the new library record. New media records, on the other hand, are not required as the media does not change, but, instead, a new model media cells association record is created that links the existing, unchanged media record with the new cells record. Such an arrangement allows the STA application to track the exact history of each monitored entity, and it also allows actions performed in the tape infrastructure (e.g., moves and exchanges) to be tied exactly to the configuration in place when the action occurred. When an exchange occurs, it will be linked by its foreign keys to the specific drive record that is most current when the exchange occurs. After a change occurs (e.g., to the drive firmware) and a new record is created in the drive properties table for the drive, new exchanges will tie to the new record that contains the new drive firmware version, and old records will tie to the old record that contains the old firmware versions.

The STA application will likely deal with a variety of data sources. The specific data elements received by the STA application will depend on the data source and on the specific type of device that is sending the data. In particular, the SNMP and SMF data sources send many of the same data elements, but each sends a few unique items. Further, the specific data elements returned by tape drives depend on the type of tape drive, with many older tape drives (e.g., 9940, LTO gen 1 and gen 2) producing very little data. The libraries holding these drives can provide information that mounts have occurred to these drives, but the drives may not provide the detailed data that newer drive typically produce. Hence, the possibility of missing or sparse data may be considered and addressed in some implementations of the STA application. When a data element is unavailable, the field of a record in the STA database may be set to NULL, and this allows all other parts of the STA application to know that a NULL value means the data is unavailable.

The data adapters are aware of the exact data being processed. When reading records produced for older devices, the data adapter should also be aware of how missing data is represented. In the SNMP Informs, for example, numeric values are modified such that a zero value means there is actually no data. Non-zero values represent actual data, but the value is one more than the true value. Thus, the data adapter is responsible for inserting NULL for a zero input value and subtracting one from non-zero values before inserting the value into the database. When doing calculations in the analytics subsystem, calculations that require inputs where data is unavailable will be unable to produce the output result. The analytics subsystem may be adapted to insert a NULL into the database for calculations that cannot be performed. When doing operations such as summarizing the total amount of data read or written in a library, the summarization module may include data only for exchanges that provide data. If the library contains older (so-called "unsupported") drives, the summarized result may include data only for the newer (so-called "supported") drives.

It may also be useful for the user interface module of the STA application to be configured to deal with missing values. For example, in tabular displays, missing values may be displayed as "NULL" or "unknown" or an appropriate icon. In graphical displays, missing values may be handled in different ways depending upon the graph. In some cases, treating the value as zero may be appropriate. For example, a pie chart that shows the total bytes read with a pie slice for each drive type may show zero as the value if the customer has unsupported drives. In other cases, it may be appropriate to omit the data series altogether. For example, if a line chart is made that shows daily totals of bytes read, with a different line for each type of drive, it may be appropriate to omit the line for unsupported drive types.

With the database (e.g., database 188, 214, 344) understood, it may be useful to explain exemplary implementations of data adapters (e.g., adapters 216, 217, 342) and their functionality in an STA application of the present description. The data adapter subsystem of the STA application functions to receive data from an external source and/or to retrieve data from an external source, and the data adapter subsystem also performs any necessary transformations and stores the transformed data in the STA database.

In one embodiment, the data sources supported are: SNMP data sources and SMF data sources. For example, SNMP (Simple Network Management Protocol) may be used as a data transport mechanism to provide a direct link to tape libraries of a user's data center. The STA application may use the SNMP protocol (or other transport mechanism) to gather data about the libraries, drives, and tape media that are present in the user's/customer's environment or tape infrastructure that is being monitored/managed. The STA application may also receive information from the libraries via SNMP traps and Informs about actions performed by the library. For mainframe-attached libraries, data may also be gathered by the data adapters from the MVS SMF subsystem (or other similar technology) and passed by the data adapters into the STA application for storage and analysis. The data provided by these two data sources may be similar, and there is considerable overlap in the individual data items provided by the two sources. However, it is useful to collect both sets of data as each source provides some data not provided by the other.

Each of the data adapters may follow the same pattern. A loader either receives the incoming data records or requests them from the external data source. The loader places the incoming records into a staging table in the database. The loader then sends a message to the transformer to process the new records. The transformer retrieves the new records from the database, performs the processing necessary to transform the data to the STA data model, and inserts the records into the tape system model and warehouse tables. The processing performed by the transformer may include parsing apart text records, converting from text to numbers or date/times, and performing calculations to convert the data from input meanings into the standardized STA model. The transformer also identifies the correct records to use as foreign keys when inserting new data into the STA database. In some cases it may be useful to retrieve new configuration data in order to populate reference tables or to synthesize records needed to satisfy referential integrity constraints.

Figure 10:
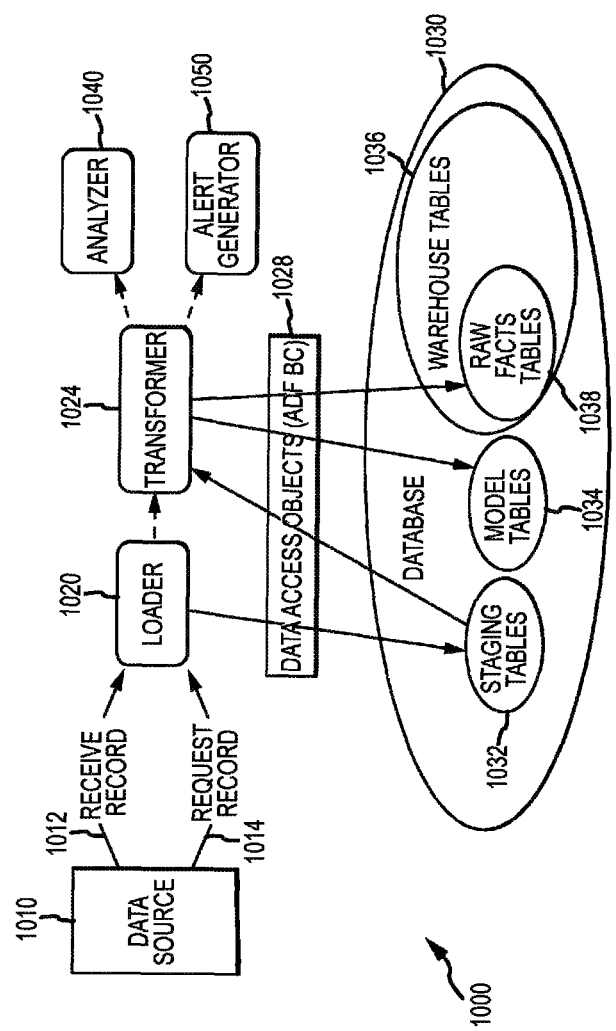
FIG. 10 illustrates a schematic or functional block diagram of a portion of data storage system implementing a data adapter to receive and retrieve data from a data source and provide this data in a raw or transformed form to tables in an STA database.

FIG. 10 illustrates a portion of data storage system 1000 implementing a typical data adapter with a loader 1020, a transformer 1024, and data access objects 1028 (see, also FIG. 2 for ADF BC 216). As shown, the loader 1020 receives 1012 or requests 1014 data records from a data source 1010, and this data is stored in staging tables 1032 in database 1030. Then, the transformer 1024 processes and transforms this data as needed to be suited for tape system model tables 1034, and also the transformer 1024 provides portions of the received data as raw or less processed data to raw facts tables 1038 of the warehouse tables 1036. The model tables 1034 and warehouse tables 1036 are then made available to the analyzer module 1040 and alert generator 1050 for further processing or use as described in more detail in other portions of this description.

Because two or more different data adapters are provided that process records from two or more different data sources, each adapter may find that the data it is attempting to load is already in the database. This happens because one event, such as a tape dismount, will cause records to be generated by two or more of the input data sources, and such a duplication of input data is a problem that needs to be addressed by the data adapter subsystem. While the events that the STA application captures have identification information associated with them, the identification may not be unique. For example, a specific tape may be mounted on the same drive twice in quick succession. A dismount event is generated each time the tape is dismounted. These events propagate to the STA application through both the SNMP data source(s) and the SMF (for mainframe tapes). This means the STA application will receive four records for the two events. The identifiers in the records, e.g., volser and drive serial number, will be the same. Further, there is no guarantee that the STA application will receive the four records in any particular order. To further complicate matters, the date/time stamps in the incoming records are typically set by different clocks and may be offset. The reconciliation step in each of the data adapters, thus, preferably is adapted to consider these complexities when determining whether or not a pre-existing database record matches with a new one.

The SNMP data adapter retrieves data directly from the tape libraries. It is the source for data about the libraries, their components, and all drives and media in the library. The SNMP data adapter handles each library independently. For example, in a SL8500 string, the STA application connects to every library in the string and retrieves data, and it uses the data about pass-through ports to assemble connected libraries into a string. The SNMP data adapter typically does not connect to either ACSLS or HSC and it, therefore, is unable to provide any information captured in these two systems. The SNMP data adapter uses the SNMP protocol to interface directly to the tape libraries. The SNMP data adapter may handle at least the following three types of data: (1) the configuration data (e.g., libraries, drives, cells, and tapes) that can be retrieved using the SNMP Get function; (2) the event data (e.g., warnings and errors) that are received from the library in the form of SNMP Traps; and (3) the dismount and move data that are received from the library in the form of SNMP Informs.

The Traps and Informs are received asynchronously by the STA application. The Get data is retrieved by the STA application. This means that two distinct loaders (e.g., loader beans or the like) are typically used in the data adapters with one receiving Traps and Informs and with another one that is executed to retrieve the Get information. A single SNMP transformer (e.g., a bean) may process the data from the staging tables and move the data into the warehouse and the tape system model.

The STA application may use an SNMP Trap loader process that continuously waits for incoming Traps. When a Trap is received, the variables are extracted from the Trap and inserted into a staging table. In some cases, several different staging tables are used in the STA database. The dismount/mount/move Informs all have a similar structure, with the bulk of the data being contained in single string. The other Traps can be grouped into sets of traps that have a similar structure, and each Trap in the same set is loaded into a single staging table. Once the incoming Trap has been inserted into the staging table, the Trap loader sends a message to the SNMP transformer.

The SNMP Get loader runs on a scheduled basis and also in response to events (e.g., SNMP Traps) received from the library. The interval may be varied to practice the STA application, but it may be limited by the load created on the library when walking the full MIB. The SNMP Get loader runs frequently in order to ensure the library is still active, but it will only typically retrieve the top set of MIB data. The full MIB is retrieved at less frequent intervals. The STA application receives a specific Trap when the configuration of the library changes. When this occurs, the SNMP Get loader retrieves the full configuration. However, some of the data fields available in the SNMP MIB are counters that increment continuously. Retrieving these counters at uniform interfaces results in more meaningful data. The SNMP Get loader also runs immediately when the STA application becomes aware of a new library. The SNMP Trap loader uses a series of staging tables for the various components of the library (cells, drives, elevators, and so on). Once a Get operation has been performed for a library, a message is sent to the SNMP transformer.

When the SNMP loader detects a library is non-responsive, it records this in a library status table. It may be possible to hold this in the same table as the SNMP "top level condition" record. The SNMP loader continues polling the library, possibly at a faster frequency than normal. When the SNMP loader detects the library is again responding, it records this fact and then immediately may perform a full MIB walk. Because the library cannot retain Traps and Informs for more than a short time, the library being inaccessible to the STA application may result in some lost data.

The SNMP transformer reads the SNMP staging tables and inserts the desired data into the warehouse and tape system model tables. The transformer is responsible for parsing apart the dismount/mount/move records and extracting the various data elements. The transformer locates the correct records in the dimension tables that define the foreign keys for the new Exchange or Move record. The SNMP transformer creates dimension records, when needed, such as if the record cannot be located. The SNMP transformer also handles the event traps, which typically translate into status records that hang off the tape system model. Another function of the SNMP transformer is to use the Get records to update the tape system model.

The SNMP transformer sends messages to the analytics subsystem to perform calculations using the Exchange and Move records and sends messages to the alert modules to evaluate new status events. The SNMP transformer is responsible for updating the tape system model and warehouse tables when the retrieved or received SNMP data differs from these tables. This will happen when a new library is detected, for example, and the SNMP transformer builds the initial version of a library's STA records. However, since communications between the library and the STA application may not be fully reliable, the SNMP transformer may at any time detect inconsistencies. In particular, if some Inform records are lost, such as during a period when the library is unable to communicate with the STA application, the STA application may have out of date locations for tapes. The full MIB walk will return current locations, and the transformer uses these to correct tape locations. However, the SNMP transformer preferably retains order of input data. Because walking the full MIB does not happen instantaneously and because robotic actions may occur after the MIB data is retrieved but before it can be processed, the SNMP transformer is adapted to avoid using stale data to override a move or exchange that occurred after the MIB data was retrieved but before it was processed.

The STA's SMF data adapter retrieves data about the tape infrastructure from the mainframe systems used for library management. The SMF data adapter retrieves data, albeit indirectly, from the HSC that runs on the MVS mainframes that are connected to many tape libraries. While the SMF data adapter provides additional data specific to mainframe tape operations, it is able to provide information only for those parts of the tape infrastructure known to the HSC system.

The SMF data adapter utilizes a data collector agent which is installed on the MVS host that is running the HSC system. The data collector agent extracts data from the MVS system and HSC and constructs records in SMF format that are sent to the SMF loader upon request. In some cases, only the fields in the SMF records that are of interest to the STA application are typically filled in. The SMF loader is a timed routine (e.g., a timer-driven bean). Periodically, it sends a request to the data collector agent for new SMF records. The data collector agent returns records created since the previous retrieval. Because the STA application attempts to run in near real time in many implementations, these retrievals are done frequently (such as on the order of every few minutes). The SMF loader places the SMF records into an SMF staging table.

Under normal circumstances, the SMF loader requests SMF records related to mount and dismount events. However, when the library configuration changes, a special record called a "Significant Event Notification" record will be inserted in the record list sent by the data collector agent. The data collector agent sends this as the last record in a batch and holds onto any SMF mount or dismount records generated after the configuration change. Hence, the SMF loader has to watch for this record, and if the record is present, the loader sends a request for the configuration information. This is also delivered in the form of SMF records, which may be better described as "SMF-like records" as they are synthesized by the data collector agent and are not generated by the MVS SMF system. Once these configuration records are received and stored in the staging table, the SMF loader makes another request for normal SMF records.

The SMF transformer parses apart the stored SMF records. It inserts or updates records in the warehouse and tape system model sections of the database. The SMF transformer locates the proper records to use as foreign keys for the fact tables, and it synthesizes these if necessary. The SMF transformer sends messages to the analyzer module of the STA application once it has inserted new records into the warehouse tables.

With regard to reconciliation between the SNMP and SMF data adapters, both the SNMP data adapter and SMF data adapter have access to some of the same information. Therefore, tape operations that are specific to a mainframe system that is connected via the SMF data adapter result in records being sent to both data adapters. Because there are unknown timing delays in both of these data paths, the STA application cannot make assumptions as to which variant of a record arrives first. Therefore, both transformer functions are typically written to handle the fact a record for a move or an exchange currently being processed may in fact have already been inserted into the database.

Both transformers locate the correct records in the dimension tables prior to inserting a new move or exchange record. This may be done by using identification information, such as drive serial numbers, to query the dimension tables to locate the correct dimension table record. These keys are then used to insert into the Move or Exchange tables. Rather than blindly inserting the new move or exchange record, the transformers typically query first to determine if the record already exists. However, it is possible that over time there will be many records in the Move and Exchange tables with the same foreign keys. When querying to determine if a match exists, the transformers may include other fields that will be the same for the two versions of the data yet are unlikely to produce matches with older records. These include fields such as the amount of data written and the number of errors. As a final check, if a record is found, the transformer may check the time. If it is "recent," the existing record may be taken as a match and updated with the fields known only to the transformer processing the record. Otherwise, the new record may just be inserted into the tables/database. The time period that constitutes "recent" may be determined once time delays of the two data paths are understood for a particular STA application implementation.

As discussed previously, the STA application includes an analytics subsystem (e.g., analytics subsystem 346 shown in FIGS. 3 and 4) that performs computations on the raw input from the data sources (e.g., after processing by the transformers of the data adapter module). These computations take two general forms: event based and time based. Event based calculations or analyses are performed when input data is received, and the results align with the input data. Therefore, they reflect events (e.g., mounts or dismounts) that occur in the user's/customer's tape infrastructure. Time based computations are based on the passage of time, and these computations reflect summarizations of what has occurred during predefined or user-defined time periods.

Figure 11:
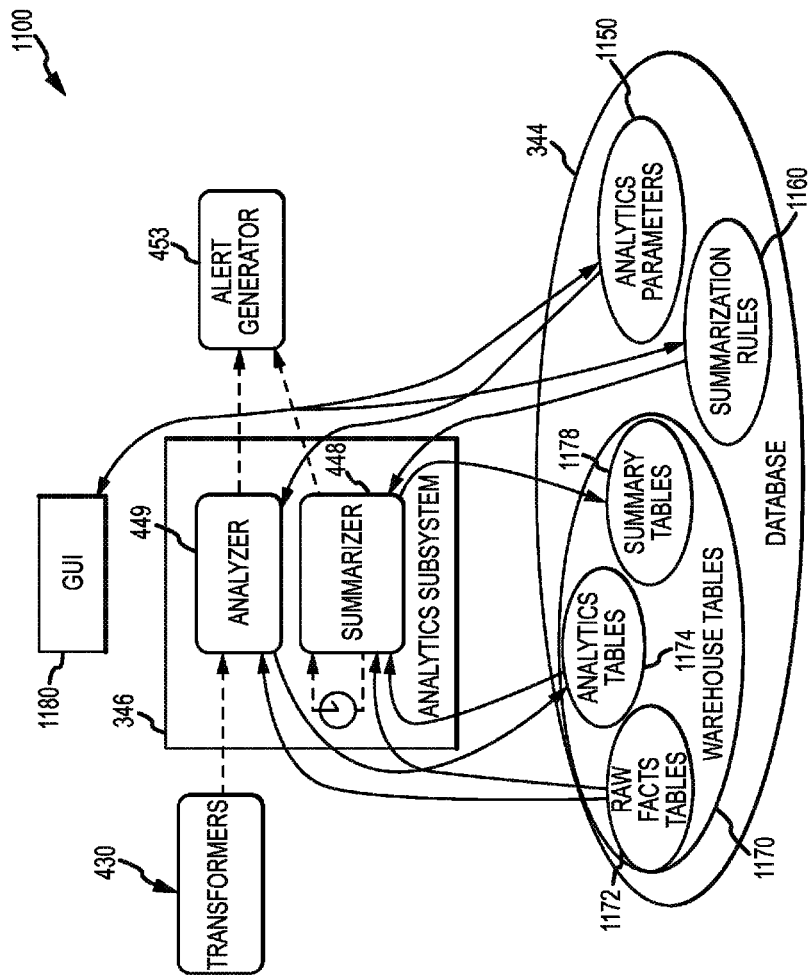
FIG. 11 illustrates a schematic diagram of a portion of a data storage system implementing a data analytics subsystem to perform analyses of raw tape operations data and to perform summarizations, with the outputs of the analytics and summarizer being viewable in a GUI and used to generate alerts.

FIG. 11 illustrates in schematic or functional block form a portion of data storage system 1100 implementing an STA application, with the analytics subsystem 346 and its operations being stressed or shown in more detail. FIG. 11 builds upon FIGS. 3 and 4 with like elements provided matching reference numbering and only explained in detail again where appropriate. As shown, two modules or tools 448, 449 (which may be provided as Java beans or the like) form the core of the analytics subsystem 346. The analyzer 449 is message driven (e.g., a message-driven bean).

During operation of the system 1100, transformers 430 from the data adapter subsystem send messages to the analyzer 449 as new data is inserted into the warehouse tables 1170 and tape system model tables of the STA database 344. The analyzer 449 reads the raw data from raw facts tables 1172 and computes the analytics, which are then saved in the database 344 in the analytics tables 1174 in the warehouse 1170. The summarizer 448 is time based (e.g., a timer-driven bean), and it runs periodically. The summarizer 448 reads data from the raw facts tables 1172 and the analytics tables 1174 of the warehouse 1170 from the STA database 344, and, in response, it computes sets of summarized results that are stored in the warehouse 1170 in summary tables 1178. The analytics results in tables 1174 and the summarized results in tables 1178 as well as portions (or all) of the raw facts in tables 1172 may be selectively viewed by user via the GUI 1180 generated by the user interface module (e.g., module 348) of the STA application. Further, the analytics results and summarized results may be used be used by the alert generator 453 as input to determine when to generate an alert.

The specific analytic calculations performed may be built into the analyzer 449. An end user may be able to edit some analytics parameters 1150 used in the analytics calculations. An example is the "how many strikes until you are out" parameter used in a suspicion calculation. These parameters 1150 are given reasonable default values, and the default or currently defined parameters may be viewed and edited in the GUI 1180 by the user of the STA application. When these parameters 1150 are changed via the GUI 1180, all analytics calculations by the analyzer 449 may be recomputed to reflect the new values. While this may mean significant computation by the STA application, it avoids a discontinuity of data that would be present if existing results that were computer with old parameter values 1150 were kept in the database 344 in tables 1174 in the warehouse 1170 while new values were being computed with different parameters 1150 and stored in the analytics tables 1174.

The summarization rules 1160 control when summaries are created, by the summarizer 448, and for what period of time. Summaries are computed for a specific time period, such as an hour, a day, or a month. The STA application is told what intervals to use for these computations and when to start the calculations, and, in this regard, a set of default rules 1160 may be provided with each installed STA application. For example, a default rule 1160 may cause the summarizer 448 to compute both drive and media summaries stored in tables 1178 on a daily basis such as each night (e.g., at midnight or the like). Another rule may call for summaries to be computed over a user-specified number of days or computing weekly summaries every night (e.g., a moving average).

The summarization rules 1160 may be viewed and edited by the user via the GUI 1180. Summaries are computed by the summarizer 448 based on these rules 1160 shortly after each set time period ends. A small delay of a few minutes or less allows for any records that are "in flight" at the end of a summary period to be received from the transformers 430 and processed by the analyzer 449 and summarizer 448. When a summarization rule 1160 is added or modified, summaries will typically be recomputed for past time periods, then summaries are computed for future times as each time period ends. When a summarization rule 1160 is deleted, all summaries computed using the rule may be deleted from the tables 1178 of the warehouse 1170.

Before turning to the alerting functions of the STA application, it may be useful to describe the analytics function in more detail as may be carried out by the data analytics subsystem in conjunction with the user interface module (and, in some cases, the alerting module). The analytics subsystem may in some embodiments function to monitor and even predict media and drive health. It may identify questionable media and drives as well as tracking/reporting drive resets and annotations. The analytics information may be shared, in some cases, with ACSLS or similar systems. The analytics subsystem may also determine runtime performance, with this data then being viewed and organized via the GUI. Such runtime performance may include determining host software runtime statistics and queuing runtime statistics (with some calculations based on ACSLS or similar information shared with the STA application).

The following are representative examples of outputs or results of the data analytics subsystem. With regard to tape media, the analytics results (or at least gathered and/or summarized data) may include: life of media; loading; read efficiency; write efficiency; repositioning; permanent errors, media degradation; search versus RW; tape idle versus activity; signal quality; block error rates; and bad data. With regard to tape drives, the analytics, summarized, and raw (or reported) data may include: life of drive; life of servo/servo tracking errors; cleaning required; data throughput efficiency; permanent errors; drive subassembly; drive degradation; servo degradation; and environmental data. With regard to a library, the analytic or gathered/reported data may include: cartridge state; cartridge configuration; media degradation; drive state; drive configuration; library events; library capacity; library topology; partition information; library diagnostics, and environmental data.

The data analytics subsystem typically will support drive and media trending analysis. This may include aggregating drive and media statistics from multiple sources to provide an overview of the entire tape infrastructure or data center environment. The trending analysis may also produce a comprehensive set of historical statistics including read/write, performance, capacity, exchange, and cleaning metrics. All drive and media data is then stored for the life of the managed device so as to provide depth for trending analysis.

The data analytics subsystem also supports drive and media health analytics. This may include generating health indicators representing a simplified view of the current state of managed devices. The health indicators may be generated through one or more algorithms or methods that utilize the historical performance of the monitored/managed devices in the tape infrastructure. These health indicators may also be designed specifically to highlight potentially vulnerable devices in a user's environment, e.g., devices that should be proactively replaced or maintained to avoid potential future problems in operation of the tape infrastructure.

The alerting module (such as module or subsystem 350 in FIGS. 3 and 4) of the STA application is used to support remote management of the health of a tape environment. The alerts may generally be thought of as including library and drive reports (which may be sent to the user or provided in the GUI) and also e-mail, text, voicemail, or other notifications (which may be sent to one or multiple addresses/recipients). Alerts generated by the STA application typically represent significant events in a monitored tape infrastructure. The STA application examines the data received from the external data sources and from its internal calculations by the data analytics subsystem to determine when an alert situation has occurred. When such a situation occurs, the STA application creates a record for the alert in its database, and then the STA application may send a notification, e.g., an e-mail or other message about the alert to one or more alert recipients. Alerts may also be viewed in the GUI, and the state of the alert may be modified by user via this GUI.

Figure 12:
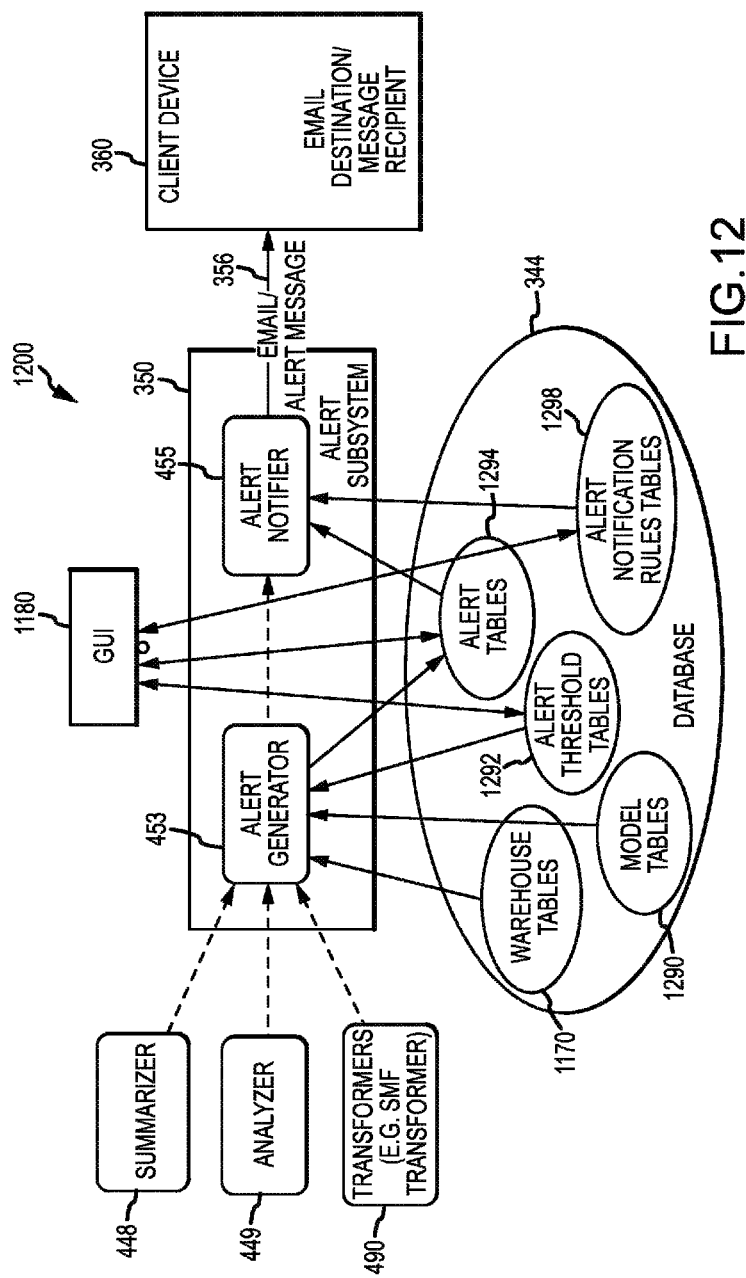
FIG. 12 illustrates a functional block or schematic illustration of a portion of a data storage system implementing an STA application to provide alerts via the STA alert subsystem.

FIG. 12 illustrates a functional block or schematic illustration of a portion of a data storage system 1200 implementing an STA application to provide alerts via the STA alert subsystem 350 to end users (via GUI 1180 and messages 356 received on a client communication device 360). This figure builds upon FIGS. 3, 4, and 11 with like components having like numbering. The alerting subsystem 360 as shown includes two message driven modules in the form of an alert generator 453 and an alert notifier 455 (e.g., message-driven beans or the like). "Alerts" are created by the alert generator 453 and stored in the alert tables 1294 of the STA database 344.

During operation of the system 1200, the alert generator 453 receives messages from the transformers 430 (from FIG. 4 shown as element 490 in FIG. 12 as a set of the transformers 430), the analyzer 449, and the summarizer 448, with these messages being created after these other modules (or beans in some cases) update the database 344 (including the warehouse tables 1170 and tape system model tables 1290) with new records. The alert generator 453 reads these records and determines if an alert should be generated based, in part, on alert threshold values stored in tables 1292 of database 344. If so, the generator 453 creates a new alert record for alert tables 1294 of database 344 and sends a message to the alert notifier 455.

The alert notifier 455 reads the alert, e.g., in the table 1294, and the alert notification rules in tables 1298. Then, if appropriate, the alert notifier will send a communication or alert message 356 (e.g., an e-mail message) about the alert to the specified destinations/recipients for receipt/viewing on client device (e.g., a wireless communication device, a personal computing device, or the like). The GUI 1180 may also be operated by a user interface module of the STA application to display alerts and allows the status to be updated/changed by the user. The GUI 1180 may also be used to create, update, and delete alert notification rules in tables 1298 of the STA database.

In some embodiments, the alerts have one or more of the following data elements: (1) a severity level; (2) a type, which gives a method for grouping alerts (e.g., similar alerts, such as drive alerts, may have the same type); (3) a reference to some entity in the model or warehouse tables, such as a drive, a tape media, or a library; (4) a simple state value, such as new, acknowledged, or dismissed; (5) a user-entered annotation; (6) a data and time that the alert was created; and (7) a history of the changes to the alert.

The alert generation module 453 may be rule-driven (e.g., a rule-driven bean that implements a small number of hard-wired rules). For example, the alert generator may utilize one or more of three alert generation rules. First, a generator may alert upon library top level conditions. This rule may state that when the "top level condition," as defined in the library MIB or the like, changes that an alert is created. The type of this alert may be "Library," and the severity may be determined by the top-level condition. For example, normal may translate to "Info" severity, degraded may translate to "Warning" severity, and not operative may translate to "Error" severity.

Second, the generator may use a device rule to process SNMP Traps from a library. For example, Error and Check traps may result in "Error" severity alerts. Warning traps may result in "Warning" severity alerts. Information and Good traps may result in "Info" severity alerts. If a specific device can be identified, such as a drive, the type of the alert may match that device type, but, if not, the type may be set to "Library." Third, the generator may use a threshold rule to process drive and media analytics and exchange data. The user can specify any attribute from the analytics or exchanges records to monitor along with a threshold and direction. The user may also specify a severity level for the alert. When the alert generator observes the specified attribute crosses the threshold in the specified direction, an alert is generated. The type of the alert may be set to "Drive" or "Media" while the severity may be the specified value of the rule.

The alerts are inserted in the alerts table in the STA database 344, and a message is sent to the alert notifier 455 to determine if an alert message 356 should be sent. The alert notifier 455 uses the alert notifier rules in table 1298 to determine if a message should be sent (along with what form the message should take (e.g., an e-mail, a text message, or the like) and to which recipients/client devices 360). These rules include an alert type, a severity level, and a recipient (e.g., an e-mail address). When a new alert is generated that matches the alert type and severity in the rules of tables 1298, an e-mail or other alert message 356 is sent to the specified address.

The description of and figures herein showing the alerting mechanism are generally based on the issuing of email (or similar personally directed form like text or the like) to the customer/user of the system. Another significant function of the alerting mechanism is to generate automated service requests (ASR), with or without customer/user intervention, to a monitoring or call center (e.g., an Oracle Call Center) when the STA system detects problems in drives or libraries. Automatically attached to each ASR will be the hardware and STA logs necessary to determine the root cause of the problem.

The functionality of the GUI 1180 that is related to alerts allows a user to view a list of alerts (e.g., in a multi view), to view a single alert (e.g., a single view), to edit the status of the alert, and to insert an annotation on the alert. The GUI 1180 allows the user to specify the threshold limits in tables 1292 in the database 344 (e.g., whether to watch drives and/or media, an attribute to watch/monitor, the threshold value, the crossing direction, and the severity level). The GUI 1180 also allows the user to create, edit, and delete notification rules in tables 1298.

The STA user interface module/component (e.g., elements 218, 348 of FIGS. 2 and 3) of the STA application (e.g., application 164, 210, 340 of FIGS. 1-3) functions to provide a unified tape monitoring interface. It may deploy a unified interface, such as a GUI on a personal computer or other client node or an interface on a mobile communications/computing device, that delivers a complete view across an entire tape complex or tape infrastructure of a data center. The user interface can be used by a data center manager to monitor libraries, drives, and media that may be provided in a single location or be geographically distributed (and/or remote from the manager using the user interface).

In some embodiments, the user interface module of the STA application provides a browser-based GUI. In other words, a user/customer may access the STA GUI using a compatible web browser on their client node/device, which is linked to a digital communications network. The user may enter an IP address or the hostname of the STA appliance or server when the STA application software is installed. Once the user enters valid login credentials (e.g., userID and password), they may be presented with a dashboard or overview screen. This screen may give a limited set of important information about a monitored tape infrastructure. From this initial screen, the user may drill down to more detailed information about the tape infrastructure.

The STA application may include focused views into a tape environment, and these may include specialized reports provided in the GUI. The specialized reports may be designed to simplify viewing and reviewing performance, health, read/write, capacity, and cleaning data elements so that a viewer/user of the STA application can quickly identify and focus on targeted areas within a tape environment. Report templates may be included that provide suspect drive and media reports. The STA application and its user interface module may provide pre-loaded/default reporting views in its GUI/user interface, but many embodiments also are designed with the flexibility to meet the needs of unique tape environments. With this in mind, the user interface module may enable a user to create and save their own report templates that are customized to suit their tape infrastructure and management/monitoring needs.

In operation, the STA application monitors and collects data about a number of entities. Examples include very concrete entities such as drives and media as well as abstract entities such as exchanges (e.g., the data about a cycle of a tape mount, I/O, and dismount) and analytics (e.g., the results of calculations performed on the data from an exchange). Entities also may include STA-specific concepts such as alerts and the configuration of library connections. The STA GUI, hence, functions to display and, in some cases, to allow editing of these entities.

Each of these entities may have a set attributes that provide information about the entity. The STA user interface module provides various screens that display information about these entities. In some cases, various aggregations of these attributes (e.g., total megabytes read by a drive during a day or the average error count of a drive over time) or counts of events are of interest to a user, and the user interface may provide ways to display such aggregated values. Some of the entities have a hierarchy, and the user interface may provide ways of navigating this hierarchy. This hierarchy is defined in the STA data model and is reflected in the GUI. While the STA application may display individual entities or sets of entities, many screens will contain data from multiple different entities. In database terms, this is a "join" operation between the different entities. For example, a "drive health" display may pick up fields for drives, exchanges, and analytics. In this description, the term "information set" may be used to refer to a set of related attributes. Displaying these information sets constitutes a large portion of the GUI functionality. Groups of identically structured information sets, such as the drive health information sets for all drives in a library, are frequently used in the STA GUI.

With regard to a useful GUI structure, the STA GUI provides one or more "windows" or "screens." Each of the screens may be divided into "panels," that are each a section of the screen where "components" appear, with components including things like menu items, combo boxes, tables, graphs, and the like (which may also be termed controls, widgets, and the so on). The STA application may show the data in an information set in various views. Some views show the attributes of a single or multiple information sets. Other views show aggregations of the attributes from a group of information sets. The aggregations may also include simple counts of items that meet specified criteria. Panels or screens that show these views may also include components that allow selection, sorting, navigation, or other functions.

In some embodiments, the user interface module of the STA application provides at least three basic types of views. First, a "single" view is provided in the user interface that shows a list of attributes for one single information set. This view is a list of named values, with the name/value pairs arranged vertically, for example, but other more complex arrangements (e.g., grouping related fields) may also be used. Second, a "multi" view is a table with multiple information sets. Each row is one information set and attributes of the information set are shown, for example, in columns. This typically is the same information shown in the single view but for more than one entity (but, of course, it is possible only one entity may be shown in such a table). Third, an "aggregate" view is provided that may also be a table. In this view, attributes of the information set are used such as for both rows and columns and show some aggregation in the cells of the table. Such a table may be thought of as a pivot or crosstab. In practice, variations of these three types of views are used throughout the STA GUI to display one or more information sets.

In addition to these three basic views, specialized views may also be provided such as a dashboard and an overview. A "dashboard" view may be provided that is a very high level view of everything that the STA application "knows" (e.g., collected raw data (in the warehouse and tape system model tables), analytics results, summarized data, health indicators, alerts, and the like). The dashboard view may be thought of as being a summarized or boiled-down version of the monitoring data. The dashboard functions to give the user a quick look at their entire tape infrastructure. The "overview" view also typically covers the entire tape infrastructure. This view provides additional detail over that provided by the dashboard view but may still provide summarized information. This summarized data may be presented in the form of charts, lists, tables, or other display components that are useful for meaningfully presenting the data from the STA database. Preferably, the STA application will be configured to provide a number of different graphs or tables that can be shown in the dashboard screen, and a user may be able to choose the items they want to be shown in the dashboard and overview screens of the user interface.

Figure 13:
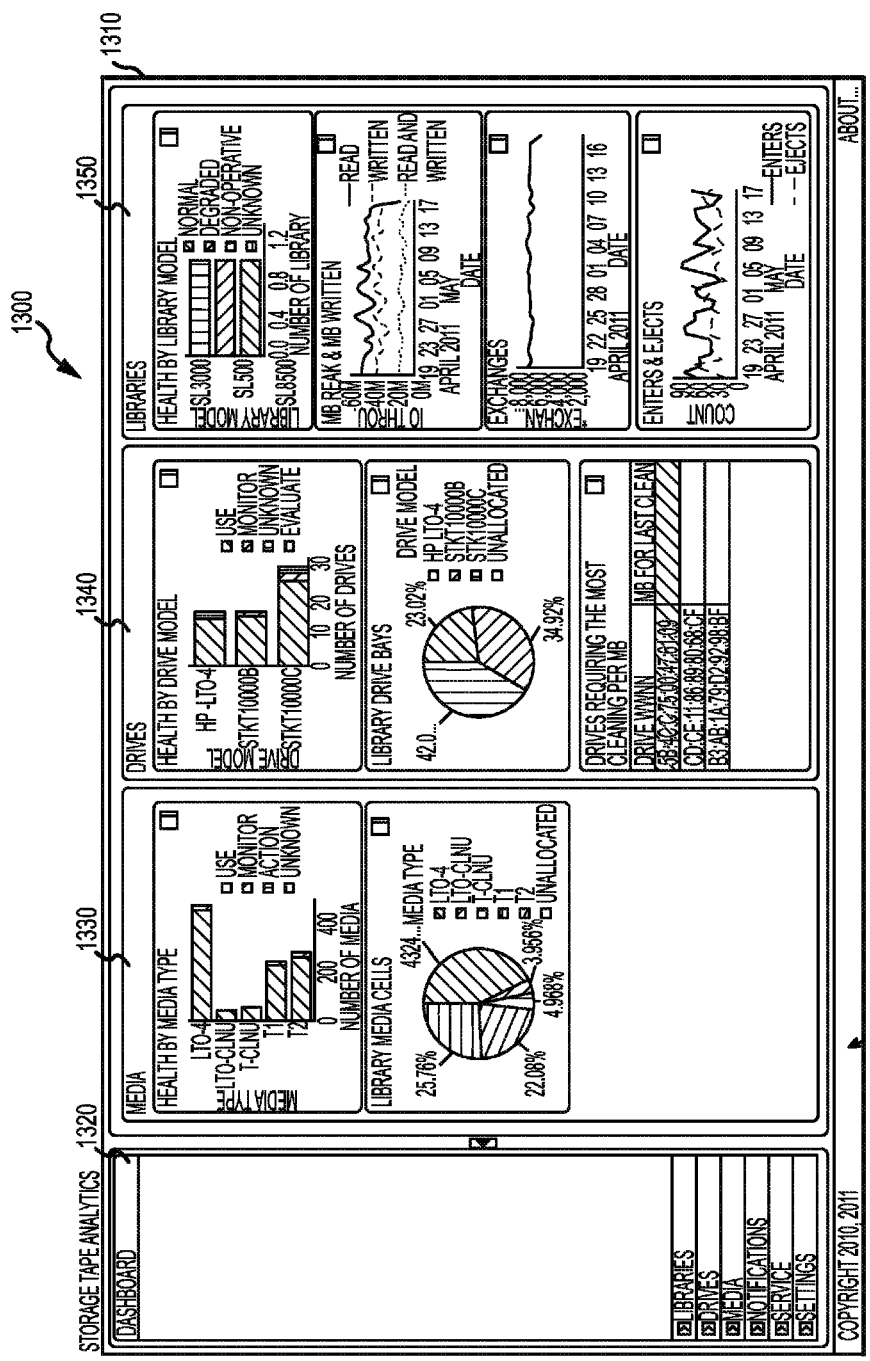
FIGS. 13-16 illustrate screen shots of an embodiment of a graphical user interface (GUI) generated by the STA application to display data gathered and computed by the STA application to a user of the STA system.

At this point, it may be useful to describe the STA user interface function with reference to several exemplary screens and views. FIG. 13 illustrates a screenshot 1300 of an exemplary GUI that may be generated by the STA application for display and interaction on a client device (e.g., a monitor of a tape operations manager's workstation or the like), and the GUI 1300 includes a window or screen 1310 providing a dashboard view, as shown with dropdown/menu panel 1320 (with the Dashboard view being selected). The dashboard of screen 1310 may be the first screen seen by an STA user when they log onto the STA system.

As shown, the dashboard view may include a number of panels providing STA data at a relatively high level. These may include: (1) a media panel 1330 (which may show, in smaller views or subpanels, health of media in the tape infrastructure such as by media type (e.g., use, monitor, action, and unknown indicates may be assigned) and may show types of media in library media cells); (2) a drives panel 1340 (which may show health by drive model, drive models in various library drive bays, and drives requiring the most cleaning per megabyte, or the like); and (3) a libraries panel 1350 (which may show health by library model, volume of data reads and writes, exchanges for a time period, enters and ejects by counts over a monitoring time period, or the like). Generally, the subpanels/views may be used to give a user status of components of tape infrastructure (such as status of libraries, media, and drives) and may show alerts in some embodiments for various components/portions of a tape infrastructure. An "Action" element may be provided in the health portlets to call monitoring personnel (customers of the STA application/service) into action.

Figure 14:
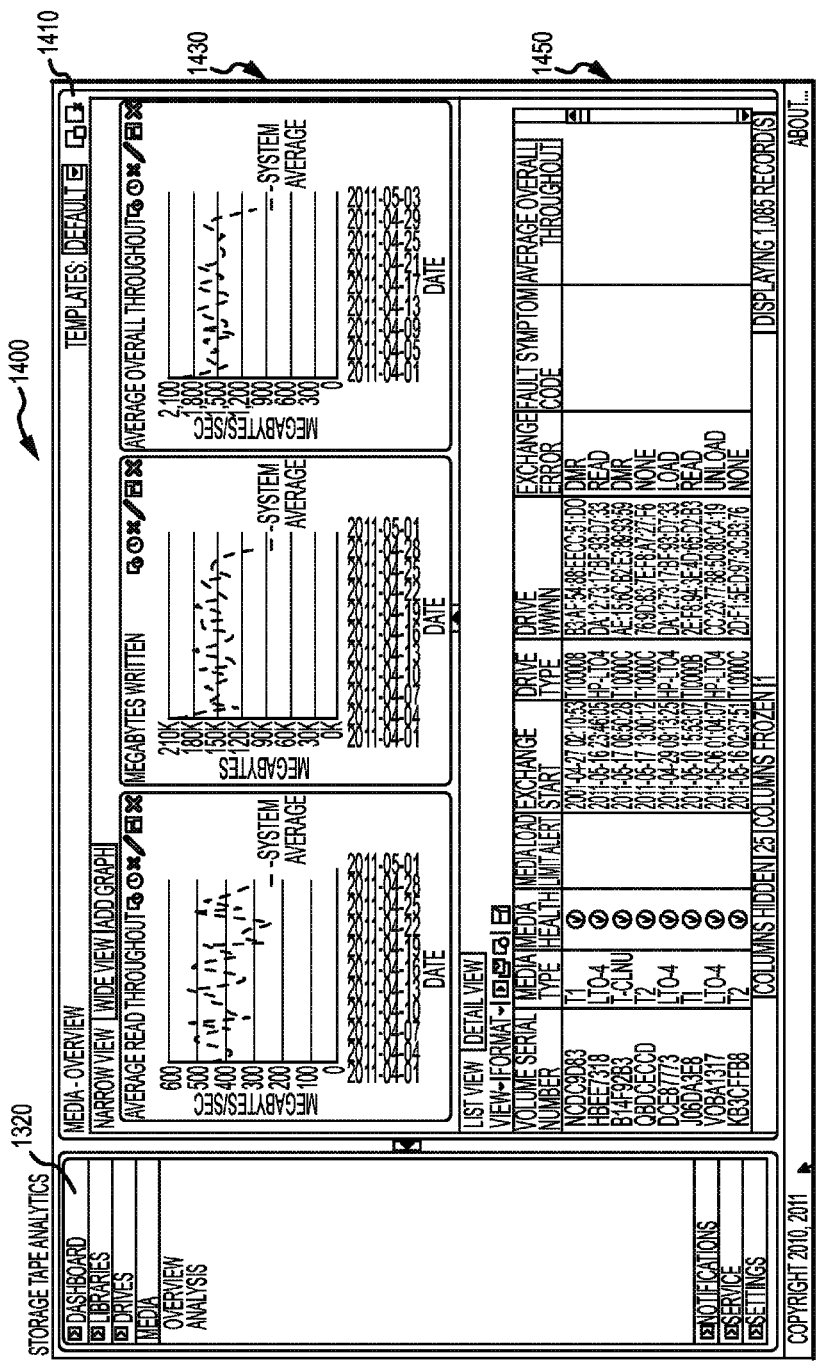

FIG. 14 illustrates a screen shot 1400 of the GUI provided by the STA application when an overview has been selected by the user for media as shown by the new state of the GUI panel 1320. A panel 1410 is provided that provides an overview view for media in the tape infrastructure monitored by the STA application. The panel is shown to include data 1430 in graph format (e.g., average read throughput, megabytes written, and average overall throughput) and also data in table form (or in list or multi view) 1450 (e.g., a table showing the following for each volume serial number: media type, media health, an alert status for a media load limit, an exchange start time, a drive type, drive WWNN, exchange errors, fault symptom codes, and average overall throughput).

Figure 15:
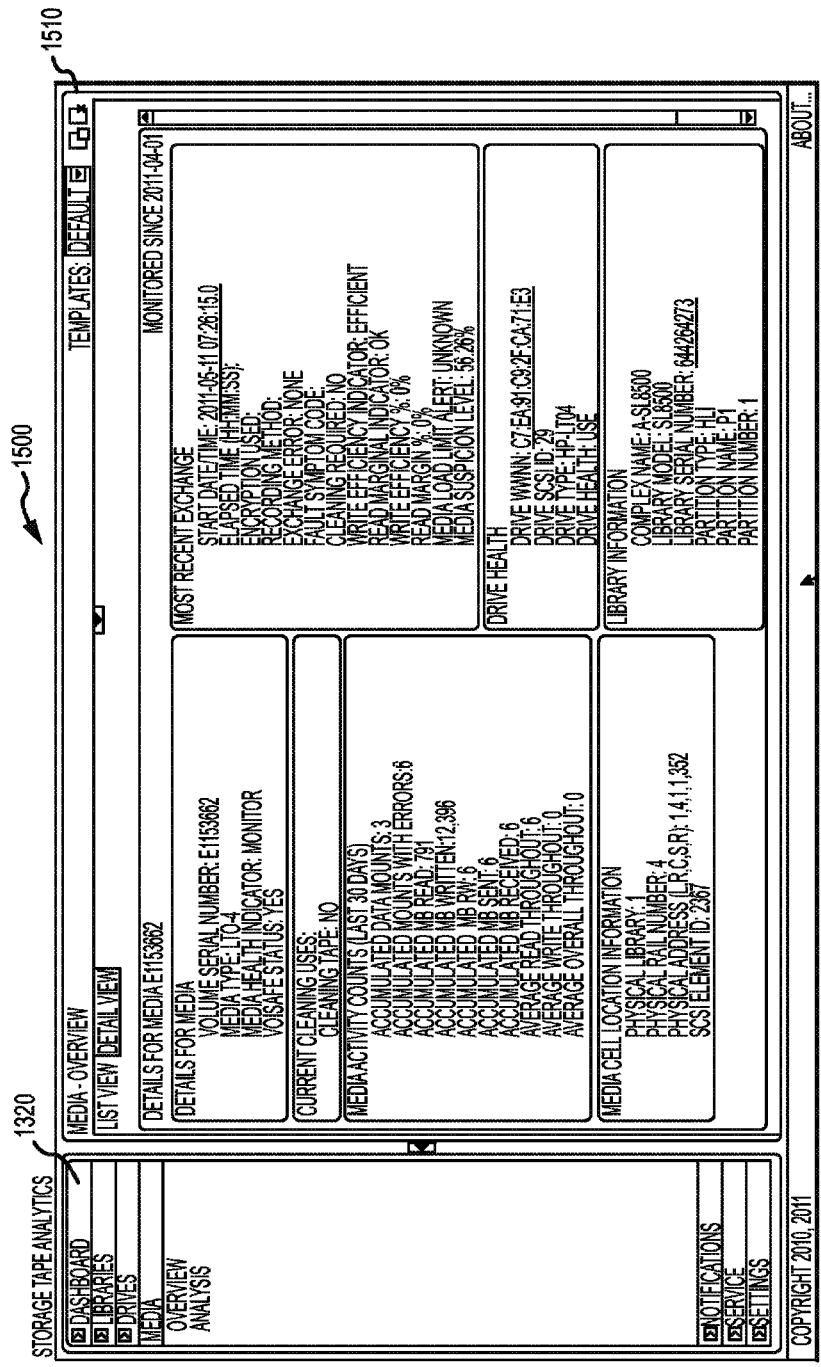

From the screen shown in FIG. 14, a user may choose to drill down or to view a single view for a particular component of the tape infrastructure. As shown in FIG. 15 with screen shot 1500 of the GUI, the user has selected a detail or single view for a particular tape media. This may provide additional STA data in raw form, in summarized form, and/or the results of analytics for the media (e.g., a health status or the like). For example, as shown, the panel or view 1510 may include subpanels or smaller views that provide: details for the media (which may include a calculated media health indicator), current cleaning uses, media activity counts for a particular prior time period, media cell location information, most recent exchange data (which may include exchange errors, a write efficiency indicator, and a media suspicion level as well as other analytics results), drive health, and library information.

Figure 16:
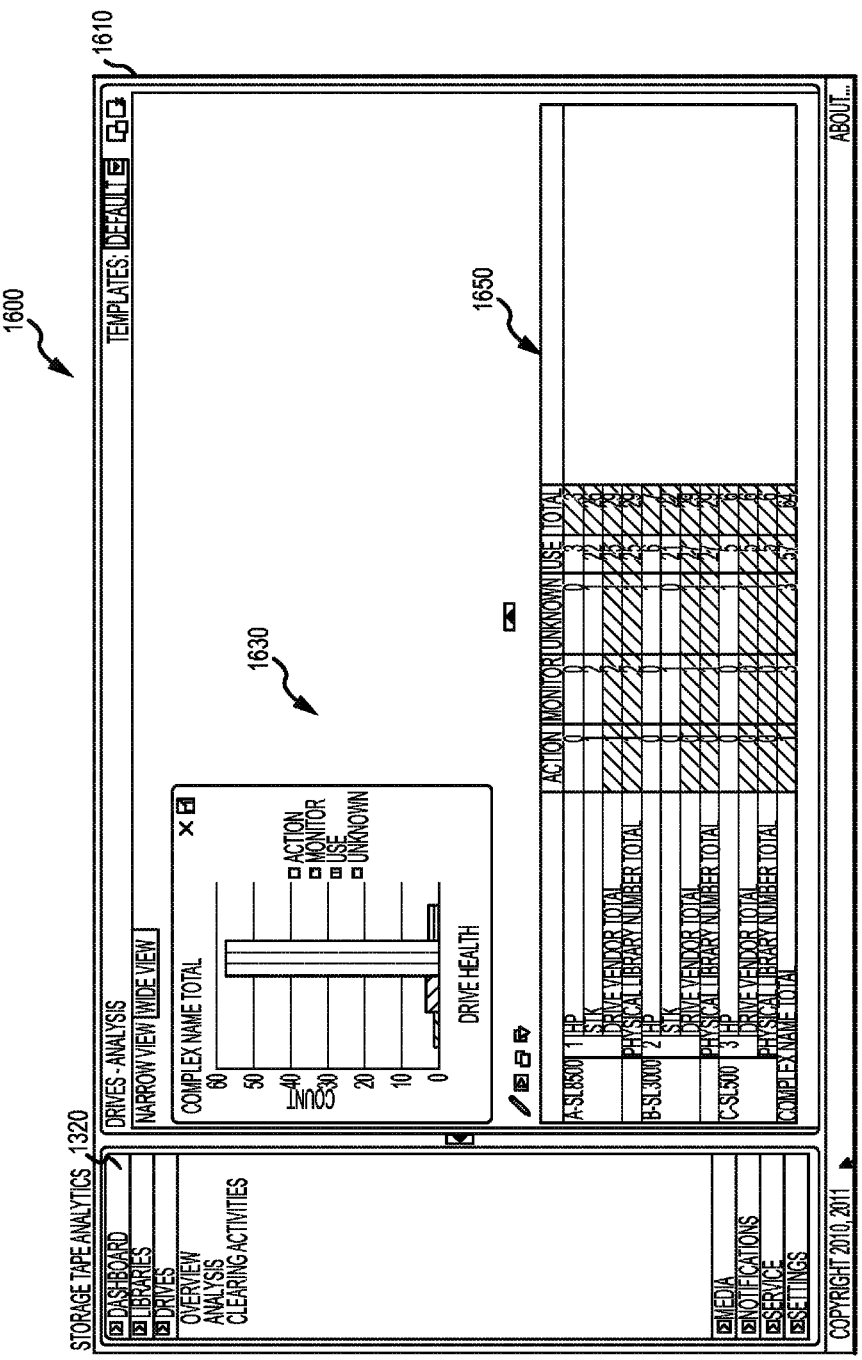

Instead of selecting an overview view, the GUI may be operated to particularly retrieve analysis data (e.g., graphics generated based on results/output of the analytics subsystem) for components of the monitored tape infrastructure. FIG. 16 illustrates a screen shot 1600 of the STA GUI after a user has selected from the pull down menu of dashboard panel 1320 to view analysis data for the drives of the tape infrastructure. In this non-limiting example, a panel or view 1610 is provided with drive analysis data from the STA database provided in graphical form at 1630 and in list/table form at 1650. This particular example shows computed or calculated health of drives with the health shown as being either unknown, use, monitor, or action (with use being good health and action being bad operational health).

As can be seen with these screen shots, much of the data captured by the STA application lends itself well to being displayed graphically. For example, a drive health report may show the latest values of drive health parameters. The STA tracks a history of these parameters in addition to the most recent values, and these values may be displayed in a multi view, with various times in the rows of the view. More particularly, this would be a multi view of the drive analytics (if individual data points are desired) or drives summaries (if periodic values are desired). Since these parameters are numeric, a graph is a natural way to show this data. Further, displaying this data as a graph allows the data for multiple parameters or for multiple drives to be displayed on one graph. Graphs may also be used to display the STA data in aggregate views. For example, pie charts and bar charts are good representations of rows or columns in an aggregate view. Small graphs called "sparklines" may be displayed inside multi and single views in the GUI. Sparklines show a graph, typically a line graph in a small size and without the usual axes and labels typically shown on larger graphs. The idea of the sparkline is to give a view of the trend in the parameter rather than a detailed view of the actual parameter values.

The single, multi, and aggregate views may be used for the different entities and information sets. In most cases, the multi and aggregate views also have selection criteria applied to them. For example, a multi view of drives might use selection criteria to limit this list to all the drives of a specific type or in a specific library. Various forms of selection may be provided by the STA user interface, tailored to the items being selected. For example, time ranges may be controlled with sliders or selections like "last 24 hours" or "last seven days" while the choice of drive type may be done using a list of possible choices, each with a check box next to it for example.

The STA GUI may, in some implementations, provide a user with capabilities to customize views to suit the user's needs. For example, ADF tables or other tools may be used to provide the ability to do sorting by clicking on column headers. The pivot tables used in the aggregate views provide the ability to swap rows and columns. In tables, columns may be hidden, exposed, and reordered. These capabilities are exposed to the STA application users.

The GUI also provides the ability to save the parameters used to define any view. Once a user has adjusted a view to show the data of interest, the user interface may save the parameters used to produce that view as a custom view or template. The users may give the view a meaningful name and choose to make the view visible to other users of the STA application/system. The saved view or template may include a base view, any selection criteria used for the view, any sorting that has been applied, and any column hiding choices. As will be understood, there are quite a large number of potential views that may be displayed by the STA user interface module. It is likely that a user may be primarily interested in a small number or subset of all these available views, and the user interface module allows them to customize these views to specifically fit their tape monitoring needs. The STA application will, in some embodiments, provide the ability to assembly a set of views and/or panels into a customized screen. A user can select the views to be displayed on a screen and then save the customized screen layout. The views added to a custom screen can be either pre-defined or default STA views or customized views.

Figure 17:
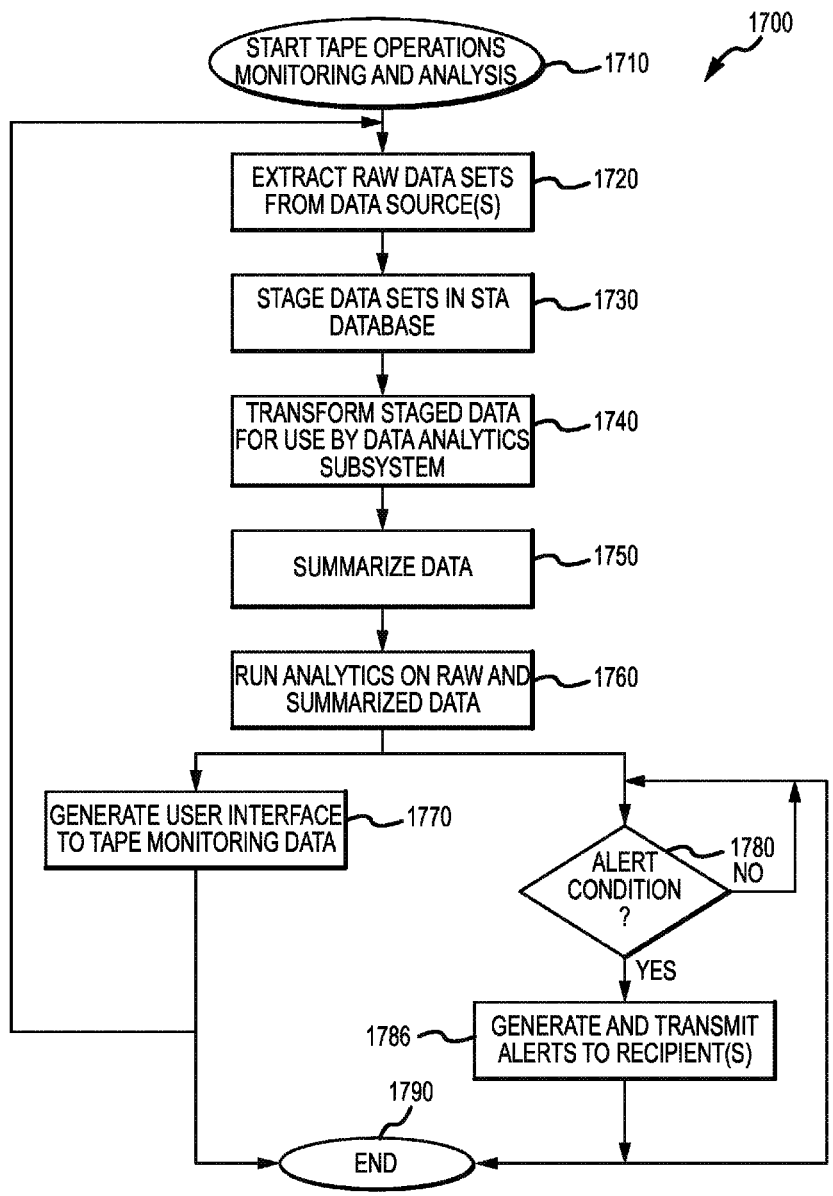

FIG. 17 provides a flow chart of a tape operations monitoring and analysis method 1700 that may be performed during operations of a data storage system described herein that includes and uses an STA application such as the STA applications shown in FIGS. 1-4. The method 1700 starts at 1710 such as with the connection of an appliance pre-loaded with an STA application into a user's data storage system or with the installation of an STA application onto a server that is communicatively linked with a data center (or tape infrastructure including one to many tape libraries), with a library management mainframe (in some embodiments), and with a user's/monitor's client device (e.g., a computer workstation, a mobile communication device, or other device for receiving data from an STA user interface module).

The method 1700 continues at 1720 with the STA application extracting raw data sets from the data sources. The data sources typically will include a tape library and the STA application may be provided direct communication with the library, and a data transport mechanism such as SNMP is used to communicate raw data (e.g., tape mount and dismount records) to the STA application. The mainframe data also may be gathered (requested in some cases by a data collector agent on the mainframe) and provided to the STA application to allow it to have a more complete set of operational data for each of the tape libraries (e.g., some of the data from the mainframe may not be found in the tape library data). At 1730, the STA application uses data loaders to store the raw data, typically with minimal parsing to retrieve useful or desired data, into staging tables in an STA database (provided in memory on the device running the STA application or otherwise accessible by the STA application). Then, at 1740, the staged raw data is processed by transformers (e.g., SNMP transformers) to normalize the data for further processing (use by the data analytics subsystem) and use in generating views of the STA GUI (use by the user interface generation module), and the transformed data is stored in tape system model tables and warehouse tables as discussed in detail previously.

The method 1700 then continues on with the data in these tables being summarized at 1750 and then (or concurrently) the summarized and raw transformed data being analyzed at 1760 (e.g., algorithms and computations being performed using analytics parameters) by the data analytics subsystem. The summarization 1750 may be performed to pre-compute some information to make the analytics module/processes at 1760 more efficient. The analytics may include computing operational values such as efficiencies and also includes determining current health of various components as well as predicting failures of these components (e.g., predicting a decline in the operational health of a drive or a tape media to a point where its use may not be advised or even possible). The results or output of the steps 1750 and 1760 are also stored in tables in the STA database.

At 1770, the method 1700 continues with generating a user interface (e.g., a browser-based GUI) to the tape monitoring data. The data includes the raw facts tables, the analytics tables, and also the summary tables, and the viewer may use default views or screens or may reorganize the displayed data or views to create customized screens for viewing the operational data for a particular monitored tape infrastructure or data center. The method 1700 may then end at 1790 or continue at 1770 or at 1720 (as data is continued to be received/gathered and processed by the STA application to update or refresh the STA data and, hence, the GUI/user interface at 1770).

At 1780, the method 1700 also is shown to include determining, with an alert module of the STA application, whether an alert condition has occurred (e.g., is an alert required based on the summarized data, raw data, analytics outputs, and alert notification rules tables). If not, the alert condition monitoring continues at 1780. If yes, the method 1700 continues at 1786 with the alert module generating an alert and transmitting alert messages to a list of recipients, e.g., sending an e-mail message or the like to each address in a list provided in the alert notification rules tables of the STA database. The alerts may also be presented in the user interface and stored in alert tables in the STA database. After step 1786, the method 1700 may continue at 1780 or end at 1790 (and, also concurrently may involve steps 1720-1760 as well as step 1770).

The above described invention including the preferred embodiment and the best mode of the invention known to the inventor at the time of filing is given by illustrative examples only. It will be readily appreciated that many deviations may be made from the specific embodiments disclosed in the specification without departing from the spirit and scope of the invention. The above description is, of course, not limited to use with a physical library or data center with multiple tape libraries. The STA application can readily be used to monitor operations of a virtual library or data center. Further, the STA application may be track operations based on physical groupings and/or based on logical groupings of entities.

At this point, it may be useful to expand upon the features and operations of the data adapters for the STA application. Specifically, it may be useful to explain in further detail steps 1720-1740 of the method 1700 of FIG. 17 to explain useful configurations for data adapter such as data adapter 342 shown in FIGS. 3 and 4 and in FIG. 10 with loader 1020 and transformer 1024. The following description provides a detailed explanation of how the data adapters are used to provide a lossless MIB (management information base) walk, to manage and correct for loss of data packets, to account for missing data (e.g., how to interpolate data received/requested), to validate data to verify it comes from expected libraries, and to collect SMF data (e.g., with an SMF transformer and with an SMF loader).

First, there are a number of requirements or challenges associated with designing and providing a lossless MIB walk service with the data adapters of an STA application. The STA application should afford a singleton service (known as an "STA MIB walk service" henceforth). The STA MIB walk service preferably will accept requests (e.g., a Request Payload and the like) for the MIB walks from several other modules of the STA application and subsequently execute those requests either asynchronously or synchronously in order to collect the configuration data of the libraries used to contextualize the operational data (traps/informs) sent by that library.

The STA MIB walk service preferably also will have multiple worker threads (e.g., Message Drive Beans or MDB instance) to work on the MIB walk requests for faster request turnaround time. Since the STA MIB walk service may not control which MDB instance would be assigned the task of executing a particular service request (e.g., as that particular aspect of the MIB walk service is controlled by the J2EE underpinnings used to implement an STA MIB walk service module), the STA MIB walk service typically should also be responsible to create memory common to all the MDB instances. Further, it may be desirable for every MIB walk request for a particular library to be instrumented with a particular span. The span of the MIB walk defines a subset of MIB sections which are walked as part of the MIB walk. Irrespective of any span specified, the core information about the target library is preferably the first data set to be fetched.

A library (e.g., an STK library) caches the MIB data for a time period which varies for different components of the library (e.g., for robots, cells, drives, media, and so on) in order to maintain its performance level as the library is very much limited on memory and CPU. An MIB walk request forwarded to the library can be served using the cached data if the data has not expired yet, or the cache can be repopulated with the latest data if the cache is expired before the request is served. However, there is no cached data for core library information, which is always gathered fresh each time it is requested. Hence, the STA MIB walk service should be able to predict when the MIB data might be expired on the library on a per MIB section basis prior to forwarding the request to the library, and the STA MIB walk service should forward a MIB walk request to the library only if the request can trigger the re-population of the cache for at least one MIB section.

Preferably, in implementation, the STA MIB walk service should not reject any service requested. It may later decide against forwarding a service to the target library if the request was not timely enough to garner any new data from the library. This also helps fulfill the goal or requirement of being accountable for every single service. Additionally, the MIB walk service should provide a mechanism to acquire a software lock on the library before forwarding any MIB walk service request to it. This is useful for guaranteeing that not more than one service requests coming in from the same STA instance is executed by a library if there is already an outstanding request sent by STA instance for which the library still has not provided a response. The next MIB walk request can typically only be started when the first one is responded to by the library. This also helps the requirement or goal of maintaining the chronological order of transforming the MIB walk data provided by the library. This in effect creates a requirement or design criteria for a dedicated MDB instance per library, which can regulate the SNPM Get requests forwarded to the library.

In some STA implementations, the data adapters include an MIB walk service that is configured to guarantee that the MIB walk requests against the same library are executed on a first-come-first-serve basis, in the same order as they were requested. Also, the MIB walk service can be adapted to guarantee that it forwards the completed MIB walk request for the transformation in a strict chronological order in which the MIB walk requests were sent to the library by the MIB walk service in order to avoid overwriting the more recent configuration/statistical data of the library by the older one. It should be noted here that the time, in this case, is the same as the MIB walk start time, but is different from the time at which the customer of MIB walk service accessed the service to request a MIB walk.

In the same or other STA implementations, the MIB walk service may be configured to guarantee that any MIB walk request with the potential of getting some new data from the library is always forwarded by the STA MIB walk service to the library (e.g., so that there are no lost MIB walk requests). Further, any configuration data retrieved during a MIB walk, irrespective of its overall successful or failed, is typically transformed or processed.

With these design goals and/or challenges in mind, it may now be useful to further describe the background context or setting for the problems associated with designing and providing data adapters in an STA application before turning to an exemplary algorithm or method for performed by data adapters used in some embodiments of an STA application. During the design phase of an initial version of the STA application, all the design criteria or goals for the STA MIB walk service enumerated above were vetted for implementation once it was decided that J2EE (Weblogic, EJB, JMS, and so on) was a useful technological framework that was going to be used to implement the STA application. However, the semantics of the J2EE framework did not support all the design criteria or goals for data adapters without additional work and/or modifications. The following points reflect how J2EE worked initially to implement the data adapters (e.g., or using J2EE "out of the box" to provide the desired functions of an STA data adapter).

The STA MIB walk service was implemented using J2EE framework. The STA MIB walk service queues each MIB walk request on a dedicated JMS queue. Then, the JMS queue assigned the request to one of the many (configurable) worker threads (MDBs) when the request reaches the head of the queue. Worker threads cannot choose the MIB walk service they want to serve, and the MS queue cannot be empowered to assign a particular request to a particular instance of MDB. In practice, the chosen MDB vets the MIB walk request for its potential to garner new information from the library. If not, the request is skipped. Then, the chosen MDB tries to "lock" the library before forwarding the MIB walk request to the library. This so-called locking involves peeking into the common memory used by all the MDB instances to see whether the library is available or it is already working on the MIB walk request sent by one of the other MDB instances.

If the locking was successful, the library returns the data to the STA application and its data adapters once it receives the request from the MDB. The incoming data is staged in the database. The STA MIB walk service unlocks the library for MIB walk service MDBs to lock the library in order to process a new request against the same library. Then, the STA MIB walk service puts the MIB walk request on a different JMS queue dedicated to feed the processor MDB which processes the data returned by the library.

As discussed above with regard to the STA application and its data adapters, all the enumerated design goals or criteria were achieved or satisfied except the following. First, the STA MIB walk service did not forward the MIB walk request to the library if the chosen MDB instance failed to lock the library, losing a potential chance to garner new data. Second, an MDB instance was not dedicated to a particular library. Third or finally, the STA MIB walk service served all the incoming MIB walk requests only via JMS queue, hence asynchronously. One main reason for this behavior was that the STA application and its data adapters did not have any use case at that time where "On-demand or synchronous MIB walk" was necessary.

With these limitations of the initial implementation of the STA application and its data adapters understood, newer embodiments of the STA application were provided with data adapters that addressed all the design goals or criteria for an STA MIB walk service. In particular this includes the design goal/criteria of dedicating an MDB instance to a particular library. The underlying algorithm or MIB walk service method can be understood through review of the following description.

As an initial step, the STA MIB walk service performed by the STA application data adapters stores all the incoming MIB walk requests in the database with the "REQUESTED" state. The request is also enqueued on a dedicated MS queue. Then, the JMS queue assigns the request to one of the many MDB instances (MDB-1), which in turn changes the status of the request to "ACCEPTED" in the database. Next, the MDB-1 asks the database to give it the oldest MIB walk request for the same target library in an ACCEPTED state to vet for its potential to garner new data from the library and forward the request to the target library if there is such a potential.

If the database (or DB) does not return any MIB walk requests with a status of "ACCEPTED," the method may go to a later step (e.g. the MDB-1 waits for the JMS queue to assign it a new MIB walk request). This means that there were no prior requests in the ACCEPTED state for the given library and the request in a prior step (e.g., MS queue assigning the request to an MDB instance) was already being served by another MDB instance (e.g., MDB-X), which was MIB walking the same target library when the prior step happened for MDB-1.

If the database or DB returns an ACCEPTED request to MDB-1, MDB-1 vets it for its potential to garner new data from the library. If there was any such potential, MDB-1 tries to reserve the library. If MDB-1 fails to reserve the library, the method may jump to a later step of the method/algorithm (e.g., the MDB-1 waits for the JMS queue to assign it a new MIB walk request). This indicates that the target library is already locked by one of the other MDB instances in an attempt to execute an MIB walk request against the same library.

If MDB-1 manages to reserve the library, MDB-1 changes the state of the request from ACCEPTED to IN PROGRESS and forwards the request to the target library. MDB-1 releases the library on conclusion of the MIB walk execution and queues the request to a dedicated queue in order the transform the garnered data irrespective of the outcome of MIB walking. The method then continues with a prior step (e.g., the MDB-1 asks the database to give it the oldest MIB walk request as discussed above). If not, MDB-1 now waits for JMS queue to assign it a new MIB Walk request.

In summary, an MDB instance which currently holds lock on a library holds onus to serve all the requests for an MIB walk against that library which has been promoted to the ACCEPTED state as long as it can successfully re-acquire the lock on the library (Lock is released after serving each MIB walk request). If some other MDB instance (MDB-X) manages to steal or obtain the lock on that particular library, the onus shifts to MDB-X to serve all the pending MIB walk requests in the ACCEPTED state in the same order they went into ACCEPTED state. There should never be any orphan MIB walk request in the ACCEPTED state because there would always be an MDB instance which holds the onus to serve the ACCEPTED request. This algorithm or walk service method to create dedicated MDB instances to particular causes (library) is versatile and usable in any similar situation, not just the one described herein. There would never be any orphan MIB walk requests in the ACCEPTED state because there would always be an MDB instance which holds the onus to serve the ACCEPTED request, hence avoiding the starvation.

Now, it may be useful to provide further details about a particular implementation of an MIB walk service used in a particular implementation of an STA application data adapter. The MIB walk service (or its algorithm) was adapted to meet the following: (1) all the payloads enqueued to the JMS queue should have equal chance of being served; (2) at any given point in time, one and only one payload of a particular type can be served; and (3) for a particular payload type, all the payload instances should be executed in the same chronological order as they were enqueued. Further, the MIB walk service (or its algorithm) was designed with the following challenges/idiosyncrasies that were inherited from using the J2EE framework understood: (1) An instance of MDB can either be idle or serving one and only one payload. MDB instance is assigned another payload of either same type or different type only upon completion of the processing; (2) Each Payload which is enqueued on the JMS queue can be assigned to one and only one MDB instance. The task of assignment is entirely handled by the J2EE framework which is a WebLogic server in case of some embodiments of the STA application. A payload does not bear any capability of influencing the selection of a particular MDB instance out of the entire pool to get processed by it. J2EE framework is completely agnostic of the type of payload in deciding an MDB instance for its processing; (3) MDB instance cannot return the payload back to the queue which assigned it; and (4) MDB instances are NOT aware of the current status of the other MDB instances in the MDB pool.

The following provides a useful MIB walk service method or algorithm, which may be carried out by data adapters, in pseudo code format. In the context of the STA application, the terminologies used in the following algorithm have the following meanings: (1) JMS queue identifies with a dedicated queue for the SNMP GET requests; (2) Payload identifies with a request for a logical unit of one or more SNMP Get operations; (3) Payload Type identifies with the target tape library which is responsible to serve and respond the SNMP Get request(s) which constitute the payload; (4) Bulletin Board identifies with the common memory afforded by the MDB pool; (5) Registration of the payload type with the Bulletin board identifies with 'Reserving' or 'Locking' the right to perform a SNMP Get operation on the tape library; (6) Payload on the JMS queue identifies with the payload in the REQUESTED state; and (7) Payload in the Bulletin Board identifies with the payload in the ACCEPTED state.

Step 1:

```
IF (There Are Payloads in JMS queue)
    The payload (Type = PL–M) at head of the JMS queue
    is assigned to an idle instance
    of MDB (MDB–X) chosen by the J2EE framework.
    Fork a thread to Go To Step 2.
    Go To Step 1.
ELSE
    J2EE framework waits for a payload to be enqueued to
    the JMS queue.
END
```

Step 2:
MDB-X puts the payload at the end of the queue dedicated to the payloads of type PL-M in the Bulletin Board and checks whether any other MDB instance of the MDB pool is already registered with the Bulletin board as processor of payloads of the type PL-M at that point in time.

```
IF (Some other MDB instance is already processing a
payload of type PL-M at that point in time)
   Go To Step 3
ELSE
   Go To Step 4
END
```

Step 3:
MDB-X informs J2EE framework that it is done processing the payload and hence is free to take up a new payload assignment.
Go To Step 1.

Step 4:
MDB-X would try to register itself with the Bulletin Board as the processor of the payloads of type PL-M.

```
IF (Registration was successful)
   MDB-X acquires the payload at the head of the queue
   for payloads of type PL-M.
   MDB-X concludes the processing of the payload.
   MDB-X unregisters itself as the processor of the payloads
   of type PL-M with the
   Bulletin Board.
ELSE
   NOTE: Some other MDB instance must have already
   registered itself as the
   processor of the payloads of type PL-M.
   Go To Step 1.
END
```

Step 5:
MDB-X checks with the Bulletin board whether a non-empty queue of payload(s) of type PL-M exists.

```
IF (Queue for payloads of type PL-M in the Bulletin Board is NOT empty)
   Go To Step 4.
ELSE
   Go To Step 3.
END
```

At this point, it may be useful to provide an exemplary operation of a data adapter to perform the lossless MIB walk service as described in the above routine/algorithm. In this example, the data adapter is described as handling a simple case where the following players or components are involved: (1) one JMS queue; (2) two instances of MDB (MDB-1, MDB-2); and (3) three different types of Payloads (PL-1, PL-2, PL-3). The payload notation used in the example algorithm is PL-M(N, t, T), where M: Payload Type, N: Instance of Payload Type, t: Net Time units required for processing, T: Value on the timeline, and ?: Undefined. Note, the shorter and/or equivalent notation of PL-M(N,t,T) is PL-MN. The Payload format PL-M(N, t, T) stands for: M: Payload Type; N: Instance of Payload Type; t: Net Time units required for processing; and T: Total time units required to complete the processing since being enqueued.

The starting list of payloads in the JMS queue is as follows (but, note, for the sake of simplicity, it is assumed that no new payloads enqueued during the course of the algorithm): (1) PL-1(1, 60, 0) or PL-11; (2) PL-1(2, 65, 0) or PL-12; (3) PL-2(1, 180, 0) or PL-21; (4) PL-3(1, 30, 0) or PL-31; (5) PL-2(2, 60, 0) or PL-22; (6) PL-3(2, 60, 0) or PL-32; (7) PL-3(3, 5, 0) or PL-33; (8) PL-1(3, 10, 0) or PL-13; (9) PL-1(4, 15, 0) or PL-14; and (10) PL-1(5, 15, 0) or PL-15. Then, the final state of the payloads would be as follows: (1) PL-1(1, 60, 60); (2) PL-1(2, 65, 125); (3) PL-3(1, 30, 155); (4) PL-2(1, 180, 180); (5) PL-3(2, 60, 215); (6) PL-2(2, 35, 215); (7) PL-3(3, 5, 220); (8) PL-1(3, 10, 225; (9) PL-1(4, 15, 230); and (10) PL-1(5, 15, 245).

The example operation can now be expressed over a timeline during processing by an STA application. At a Time 0, the initial state may be: MDB-1: Idle; MDB-2: Idle; and Bulletin Board: CLEAR. The activities occurring or having occurred may be: (1) for MDB-1: (a) JMS queue assigned PL-11—Accepted, (b) Registered PL-1 with Bulletin Board, and (c) Start processing PL-11; and (2) for MDB-2: (a) JMS queue assigned PL-12—Parked in Bulletin Board, (b) JMS queue assigned PL-21—Accepted, (c) Registered PL-2 with Bulletin Board, and (d) Start processing PL-21. Then, the final state may be described as: MDB-1: PL-11; MDB-2: PL-21; and Bulletin Board: {MDB-1: PL-1; MDB-2: PL-2; PL-1: PL-12}.

Then, at a Time 60, the initial state may be: MDB-1: PL-11; MDB-2: PL-21; and Bulletin Board: {MDB-1: PL-1; MDB-2: PL-2; PL-1: PL-12}. The activities occurring or having occurred at this time may be: (1) for MDB-1: (a) Finished processing of PL-11, (b) Picking up PL-12 from Bulletin Board, and (c) Start processing PL-12; and (2) for MDB-2: Processing PL-21. Then, the final state may be described as: MDB-1: PL-12; MDB-2: PL-21; and Bulletin Board: {MDB-1: PL-1; MDB-2: PL-2}.

Next, at a Time 125, the initial state may be: MDB-1: PL-12; MDB-2: PL-21; and Bulletin Board: {MDB-1: PL-1; MDB-2: PL-2}. The activities occurring at this time may be: (1) for MDB-1: (a) Finished processing PL-12, (b) Unregistered PL-1 from Bulletin Board, (c) JMS queue assigned PL-31—Accepted, (d) Registered PL-3 with Bulletin Board, and (e) Start processing PL-31; and (2) for MDB-2: Processing PL-21. Then, the final state may be described as: MDB-1: PL-31; MDB-2: PL-21; and Bulletin Board: {MDB-1: PL-3; MDB-2: PL-2}.

At a Time 155, the initial state may be: MDB-1: PL-31; MDB-2: PL-21; and Bulletin Board: {MDB-1: PL-3; MDB-2: PL-2}. The activities occurring may be: (1) for MDB-1: (a) Finished processing PL-31, (b) JMS queue assigned PL-22—Parked in Bulletin Board, (c) JMS queue assigned PL-32—Accepted, and (d) Start processing PL-32; and (2) for MDB-2: Processing PL-21. Then, the final state may be described as: MDB-1: PL-32; MDB-2: PL-21; and Bulletin Board: {MDB-1: PL-3; MDB-2: PL-2; PL-2: PL-22}.

At a Time 180, the initial state may be: MDB-1: PL-32; MDB-2: PL-21; and Bulletin Board: {MDB-1: PL-3; MDB-2: PL-2; PL-2: PL-22}. The activities occurring may be: (1) for MDB-1: Processing PL-32; and (2) for MDB-2: (a) Finished Processing PL-21, (b) Picking up PL-22 from Bulletin Board, and (c) Start processing PL-22. Then, the final state may be described as: MDB-1: PL-32; MDB-2: PL-22; and Bulletin Board: {MDB-1: PL-3; MDB-2: PL-2}.

At a Time 215, the initial state may be: MDB-1: PL-32; MDB-2: PL-22; and Bulletin Board: {MDB-1: PL-3; MDB-2: PL-2}. The activities may be: (1) for MDB-1: (a) Finished Processing PL-32, (b) Unregistered PL-3 from Bulletin Board, (c) JMS queue assigned PL-13—Accepted, (d) Registered PL-1 in Bulletin Board, and (e) Start processing PL-13; and (2) for MDB-2: (a) Finished Processing PL-22, (b) Unregistered PL-2 from Bulletin Board, (c) JMS queue assigned PL-33—Accepted, (d) Registered PL-3 in Bulletin Board, and (e) Start processing PL-33. Then, the final state may be described as: MDB-1: PL-13; MDB-2: PL-33; and Bulletin Board: {MDB-1: PL-1; MDB-2: PL-3}.

At a Time 220, the initial state may be: MDB-1: PL-13; MDB-2: PL-33; and Bulletin Board: {MDB-1: PL-1; MDB-2: PL-3}. The activities may be: (1) for MDB-1: Processing PL-13; and (2) for MDB-2: (a) Finished Processing PL-33, (b) Unregister PL-3 from Bulletin Board, (c) JMS queue assigned PL-14—Park in Bulletin Board, (d) JMS queue assigned PL-15—Park in Bulletin Board, and (e) Go Idle. Then, the final state may be: MDB-1: PL-13; MDB-2: Idle; and Bulletin Board: {MDB-1: PL-1; PL-1: PL-14, PL-15}.

At a Time 225, the initial state may be: MDB-1: PL-13; MDB-2: Idle; and Bulletin Board: {MDB-1: PL-1; PL-1: PL-14, PL-15}. The activities occurring may include: (1) for MDB-1: (a) Finished Processing PL-13, (b) Picking up PL-14 from Bulletin Board, and (c) Start processing PL-14; and (2) for MDB-2: Sitting Idle or Killed. The final state may be described as: MDB-1: PL-14; MDB-2: Idle or Killed; and Bulletin Board: {MDB-1: PL-1; PL-1: PL-15}.

At a Time 230, the initial state may be: MDB-1: PL-14; MDB-2: Idle OR Killed; and Bulletin Board: {MDB-1: PL-1; PL-1: PL-15}. The activities occurring may include: (1) for MDB-1: (a) Finished Processing PL-14, (b) Pick up PL-15 from the Bulletin Board, and (c) Start processing PL-15; and (2) for MDB-2: Sitting Idle or Killed. Then, the final state may be: MDB-1: PL-15; MDB-2: Idle or Killed; and Bulletin Board: {MDB-1: PL-1}.

Finally, at Time 245, the initial state may be: MDB-1: PL-15; MDB-2: Idle OR Killed; and Bulletin Board: {MDB-1: PL-1}. The activities may include: (1) for MDB-1: (a) Finished Processing PL-15, (b) Unregister PL-1 from Bulletin Board, and (c) Go idle; and (2) for MDB-2: Sitting Idle or Killed. Then, the final state may be: MDB-1: idle or Killed; MDB-2: Idle or Killed; and Bulletin Board: Empty.

It is believed that the discussion above will explain in full how to implement a lossless MIB walk service as part of data adapter in an STA application. It will or should also be recognized that this information is only about a particular issue solved in providing an SNMP adapter (e.g., see data adapter subsystem 342 of the system of FIG. 4), which may function to create a dedicated Message Drive Bean (MDB) instance using shared memory (e.g., the Bulletin Board discussed above). This teaches one exemplary implementation or algorithm that acts to assign at most one dedicated physical instance of MDB from the pool in order process the payload of a particular type at a given point in time, although the actual MDB instance from the MDB pool may keep on changing under the cover or in the background. A different way of addressing this problem may involve splitting a single JMS queue using certain criteria (e.g., the type of the payload in the above example).

It may be useful to take note of the following with regard to the exemplary data adapter implementation: (1) the following traits can be derived from the algorithm depicted in section: (a) an instance of MDB is always guaranteed to a particular payload type if a non-empty queue of payloads of that type exists in the Bulletin Board; (b) an instance of MDB allocated to a particular payload type may vary during the course of the algorithm; (c) at any given time, there can be at most one queue per payload type in the Bulletin Board; and (d) the number of non-empty queues of payloads in the Bulletin Board can never exceed the total number of the physical MDB instances in the pool; (2) there typically would never be starvation caused due to a payload type waiting for ever to be assigned a physical instance of MDB; (3) there also typically would never be starvation caused due to a payload (of any type) waiting for ever to be processed by an MDB instance; (4) the wait time for a particular payload in the holding pan (e.g., Bulletin Board) most often would never be more than the time if the JMS queue was dedicated to a single payload type and there was only one instance of MDB in the pool (singleton); (5) all the payloads of a particular type are generally processed in the same chronological order as they were placed on the JMS queue; and (6) a payload at the head of the queue is assigned a dedicated MDB instance if not already done, that is another payload of the same type is already being processed at that time.

This exemplary data adapter in the STA application (or the SNMP adapter or SNMP modules of the data adapter) supports an MIB walk and transformation of additional library devices. These additional library devices may include, but are not limited to, robots, PTPs, elevators, controllers, and CAPs in the same capacity as drives and media. Typically, the only difference is the type of the records fetched from the library, as the way they are fetched, transformed, and persisted in the database is typically exactly the same.

There are a number of challenges associated with collecting or obtaining SMF data with data adapters of an STA application (e.g., as shown at 420 with SMF loader 410 and SMF transformer 430 in the data adapter 342 of FIG. 4), and implementations of data adapters that are configured to collect and process SMF data are described in detail.

In some cases, an agent (e.g., a MAT agent) may be used or provided on or in connection to a mainframe library to facilitate SMF data collection and processing/transformation via communications to a MAT proxy provided as part of or in communication with the data adapters of the STA application. In some implementations, the MAT agent includes two parts: a data collector and a data transmitter. The data collector itself can be split into two parts, the first being the collection of the configuration information and the second being the collection of the SMF records. The configuration information can be obtained from ELS when the MAT agent first starts and when it is first informed by ELS that a configuration change has been made. This information is stored in internal control blocks and sent to the MAT proxy when requested. The SMF records are collected by an external exit and stored into an area of common storage that the MAT agent scans at regular intervals to pick up any new records. These records are stored in an external file and sent to the MAT proxy when requested. This external file is purged of older records on a regular basis. The definition of the reorganization frequency and how long to keep records may be customer defined.

In some cases, the MAT agent works as a server in that it responds to commands for information sent in from the MAT proxy. When the MAT proxy first connects to the MAT agent, it requests the configuration information. Once that has been received, it then in a loop asks for the SMF records. If the MAT agent has been informed of a change in configuration, then in the response to the next SMF record request, the MAT proxy is told of the change and it, in turn, asks the MAT agent for the updated configuration information. Note that what is sent is typically the whole of the configuration information so it will be up to the SMF transformer to process all this information. This configuration information may also contain details of deleted entities, e.g., ACSes, LSMs, and the like.

When the MAT proxy first connects to the MAT agent, it sends a command to connect to the MAT agent (e.g., a CCCCONN command). Then, the MAT proxy asks for the configuration information. After the MAT proxy asks for the configuration information, it then sends a command (e.g., a CCGETDAT command) to obtain the SMF records (e.g., the non-configuration records that the MAT agent collects). This command may include the stream ID, the start date of records to return, the end date of records to return, the date of TMS records, the burst limit, and a restart date for real-time records or start date for historical records. The response to this command includes all the SMF records, which may include the HSC sub-type 7 and 32 records and the responses for historical streams.

Due to the possibly large number of responses that can be sent for this command especially in relation to historical SMF records, the command may only return a set number of records in each block, e.g., as set by a burst limit specified in the command. If a customer or user of the STA application wants to send historical SMF records to the STA application, they may first have to run a batch job that passes the SMF records to the MAT agent. The MAT agent stores these records in its external SMF file for later transmission to the MAT agent. These records are stored with an indicator that they are historical records so that the MAT proxy does not send them as part of the real time SMF stream.

Figure 18A:
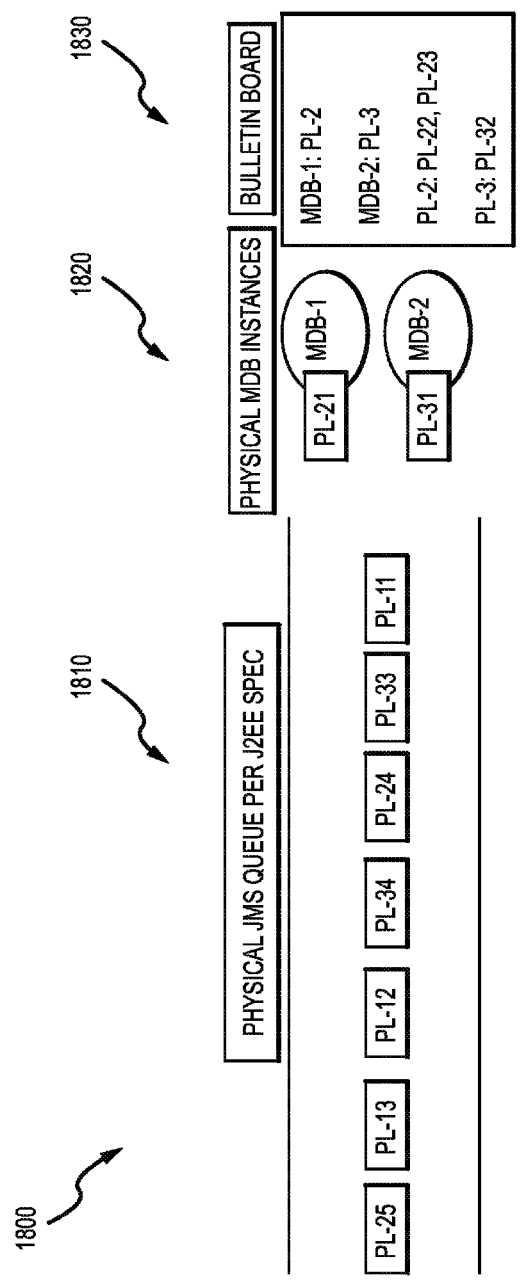
FIGS. 18A and 18B provide diagrams of a physical framework and a logical framework, respectively, of a lossless MIB walk.
Figure 18B:
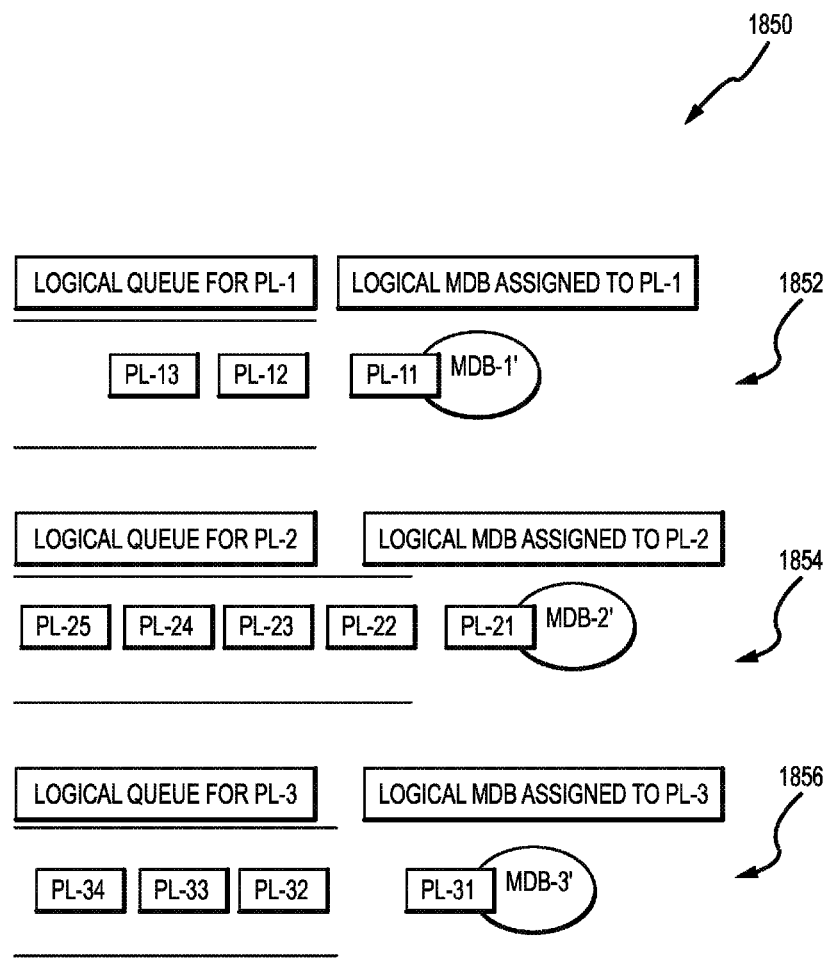

FIG. 18A illustrates a diagram of a physical framework 1800 for a representative lossless MIB walk as may be performed as described in detail herein. The physical framework 1800 is made up of a physical JMS queue 1810, a number of physical MDB instances 1820, and a Bulletin Board 1830. FIG. 18B shows an equivalent logical framework 1850 of the physical framework 1800 of FIG. 18A. The logical framework 1850 includes logical queues 1852, 1854, 1856 (e.g., queues from PL-1, PL-2, and PL-3 in this non-limiting example). In the diagrams 1800 and 1850, logical MDB instances can be expressed with mathematical notations as: $\{MDB\text{-}X'|(X \geq 1 \cap X \leq 3), MDB\text{-}X' \in \{\Phi \cup \{MDB\text{-}1, MDB\text{-}2\}\}\}$.

We claim:

1. A data storage system for monitoring and analysis of a tape infrastructure, comprising:
   a tape library comprising a plurality of tape drives and a plurality of tape media for use in the tape drives;
   a server communicatively linked to the tape library;
   a tape analytics database provided in a data storage device; and
   on the server, a storage tape analytics application with a data adapter receiving and requesting data sets from the tape library,
   wherein the data sets correspond to operations of the tape library including use of the tape drives and the tape media during data storage in the tape library,
   wherein the data adapter stores the data sets in the tape analytics database,
   wherein the storing of the data sets by the data adapter comprises parsing raw data from the data sets and inserting the raw data into staging tables and then transforming the raw data to a predefined data model for further processing by the storage tape analytics application, and
   wherein the parsing comprises parsing apart text records, converting text to numbers, dates, or times, and performing calculations to convert portions of the raw data into values accepted by the predefined data model.

2. The data storage system of claim 1, wherein the data sets include data about robotic actions to: mount media into the tape drives; dismount media from the tape drives; and move media inside, into, or out of the automated tape libraries, the extracted data sets further including data about activity of the tape drives while the tape media is mounted.

3. The data storage system of claim 1, wherein the storing of the data sets by the data adapter comprises determining sets of missing data in the data sets and transforming the sets of missing data in a predefined manner to identify the sets of missing data for processing by an analytics module.

4. The data storage system of claim 3, wherein the transforming of the sets of missing data includes inserting NULL for a zero input and subtracting one from non-zero values before inserting the non-zero values into the tape analytics database.

5. The data storage system of claim 1, wherein the storing of the data sets by the data adapter comprises performing a reconciliation step to locate duplicate input in the data sets by querying the tape analytics database to determine if a match exists and discarding the located duplicate input prior to storing the data sets into the tape analytics database.

6. The data storage system of claim 1, further comprising a library management system operating to manage operations of the tape library, wherein the data adapter receives data corresponding to operations of the tape library and the library management system from a data collector agent on the library management system, wherein the received data includes SMF data, and wherein the data adapter includes an SMF transformer acting to normalize the SMF data to a standard form for use in the tape analytics database.

7. A data storage system for monitoring and analysis of a tape infrastructure, comprising:
   a virtual or physical tape library comprising a plurality of tape drives and a plurality of tape media for use in the tape drives;
   a tape analytics database in memory; and
   on a server linked to the tape library, data adapters extracting data sets from the tape library corresponding to operations of the tape library including use of the tape drives and the tape media during data storage in the tape library, the data adapters storing the extracted data sets in the tape analytics database,
   wherein the extracted data sets include mount records and dismount records for the tape drives,
   wherein the extracting of the data sets comprises receiving Simple Network Management Protocol (SNMP) data pushed from the tape library, and
   wherein the storing of the extracted data sets by the data adapter comprises determining sets of missing data and transforming the extracted data sets by storing a data value indicative of each element of the missing data in the tape analytics database to facilitate processing of the stored data sets including the missing data.

8. The data storage system of claim 7, further wherein the extracting of the data sets comprises parsing the SNMP data to extract raw data on the data storage operation, storing the parsed raw data in staging tables in memory, and transforming the parsed raw data into input for a predefined data model for processing by an analytics module run on the server.

9. The data storage system of claim 7, wherein the transforming of the sets of missing data includes inserting NULL for a zero input and subtracting one from non-zero values before inserting the non-zero values into the tape analytics database.

10. The data storage system of claim 7, wherein the storing of the extracted data sets by the data adapter comprises performing a reconciliation step to locate duplicate input data in the data sets by querying the tape analytics database to determine if a match exists and discarding the located duplicate input prior to storing the extracted data sets into the tape analytics database.

11. A data storage system for monitoring and analysis of a tape infrastructure, comprising:
   a tape library comprising a plurality of tape drives and a plurality of tape media for use in the tape drives;

a server communicatively linked to the tape library;
a tape analytics database provided in a data storage device; and
on the server, a storage tape analytics application with a data adapter receiving and requesting data sets from the tape library,
wherein the data sets correspond to operations of the tape library including use of the tape drives and the tape media during data storage in the tape library,
wherein the data adapter stores the data sets in the tape analytics database, and
wherein the storing of the data sets by the data adapter comprises determining sets of missing data in the data sets and transforming the sets of missing data in a predefined manner to identify the sets of missing data for processing by an analytics module.

12. The data storage system of claim 11, wherein the data sets include data about robotic actions to: mount media into the tape drives; dismount media from the tape drives; and move media inside, into, or out of the automated tape libraries, the extracted data sets further including data about activity of the tape drives while the tape media is mounted.

13. The data storage system of claim 11, wherein the storing of the data sets by the data adapter comprises parsing raw data from the data sets and inserting the raw data into staging tables and then transforming the raw data to a predefined data model for further processing by the storage tape analytics application.

14. The data storage system of claim 11, wherein the transforming of the sets of missing data includes inserting NULL for a zero input and subtracting one from non-zero values before inserting the non-zero values into the tape analytics database.

15. The data storage system of claim 11, wherein the storing of the data sets by the data adapter comprises performing a reconciliation step to locate duplicate input in the data sets by querying the tape analytics database to determine if a match exists and discarding the located duplicate input prior to storing the data sets into the tape analytics database.

16. The data storage system of claim 11, further comprising a library management system operating to manage operations of the tape library, wherein the data adapter receives data corresponding to operations of the tape library and the library management system from a data collector agent on the library management system, wherein the received data includes SMF data, and wherein the data adapter includes an SMF transformer acting to normalize the SMF data to a standard form for use in the tape analytics database.

17. A data storage system for monitoring and analysis of a tape infrastructure, comprising:
a tape library comprising a plurality of tape drives and a plurality of tape media for use in the tape drives;
a server communicatively linked to the tape library;
a tape analytics database provided in a data storage device; and
on the server, a storage tape analytics application with a data adapter receiving and requesting data sets from the tape library,
wherein the data sets correspond to operations of the tape library including use of the tape drives and the tape media during data storage in the tape library,
wherein the data adapter stores the data sets in the tape analytics database, and
wherein the storing of the data sets by the data adapter comprises performing a reconciliation step to locate duplicate input in the data sets by querying the tape analytics database to determine if a match exists and discarding the located duplicate input prior to storing the data sets into the tape analytics database.

18. The data storage system of claim 17, wherein the data sets include data about robotic actions to: mount media into the tape drives; dismount media from the tape drives; and move media inside, into, or out of the automated tape libraries, the extracted data sets further including data about activity of the tape drives while the tape media is mounted.

19. The data storage system of claim 17, wherein the storing of the data sets by the data adapter comprises parsing raw data from the data sets and inserting the raw data into staging tables and then transforming the raw data to a predefined data model for further processing by the storage tape analytics application.

20. The data storage system of claim 17, further comprising a library management system operating to manage operations of the tape library, wherein the data adapter receives data corresponding to operations of the tape library and the library management system from a data collector agent on the library management system, wherein the received data includes SMF data, and wherein the data adapter includes an SMF transformer acting to normalize the SMF data to a standard form for use in the tape analytics database.

21. A data storage system for monitoring and analysis of a tape infrastructure, comprising:
a tape library comprising a plurality of tape drives and a plurality of tape media for use in the tape drives;
a server communicatively linked to the tape library;
a tape analytics database provided in a data storage device; and
on the server, a storage tape analytics application with a data adapter receiving and requesting data sets from the tape library,
wherein the data sets correspond to operations of the tape library including use of the tape drives and the tape media during data storage in the tape library,
wherein the data adapter stores the data sets in the tape analytics database, and
wherein the data storage system further comprises a library management system operating to manage operations of the tape library, wherein the data adapter receives data corresponding to operations of the tape library and the library management system from a data collector agent on the library management system, wherein the received data includes SMF data, and wherein the data adapter includes an SMF transformer acting to normalize the SMF data to a standard form for use in the tape analytics database.

22. The data storage system of claim 21, wherein the data sets include data about robotic actions to: mount media into the tape drives; dismount media from the tape drives; and move media inside, into, or out of the automated tape libraries, the extracted data sets further including data about activity of the tape drives while the tape media is mounted.

23. The data storage system of claim 21, wherein the storing of the data sets by the data adapter comprises parsing raw data from the data sets and inserting the raw data into staging tables and then transforming the raw data to a predefined data model for further processing by the storage tape analytics application.

24. A data storage system for monitoring and analysis of a tape infrastructure, comprising:
a virtual or physical tape library comprising a plurality of tape drives and a plurality of tape media for use in the tape drives;
a tape analytics database in memory; and on a server linked to the tape library, data adapters extracting data sets from the tape library corresponding to operations of the tape library including use of the tape drives and the tape media during data storage in the tape library, the data adapters storing the extracted data sets in the tape analytics database, wherein the extracted data sets include mount records and dismount records for the tape drives, wherein the extracting of the data sets comprises receiving Simple Network Management Protocol (SNMP) data pushed from the tape library, and wherein the storing of the extracted data sets by the data adapter comprises performing a reconciliation step to locate duplicate input data in the data sets by querying the tape analytics database to determine if a match exists and discarding the located duplicate input prior to storing the extracted data sets into the tape analytics database.

25. The data storage system of claim 24, further wherein the extracting of the data sets comprises parsing the SNMP data to extract raw data on the data storage operation, storing the parsed raw data in staging tables in memory, and transforming the parsed raw data into input for a predefined data model for processing by an analytics module run on the server.

* * * * *

UNITED STATES PATENT AND TRADEMARK OFFICE
CERTIFICATE OF CORRECTION

| | | |
|---|---|---|
| PATENT NO. | : 8,842,384 B2 | Page 1 of 1 |
| APPLICATION NO. | : 14/068128 | |
| DATED | : September 23, 2014 | |
| INVENTOR(S) | : Jhatakia et al. | |

It is certified that error appears in the above-identified patent and that said Letters Patent is hereby corrected as shown below:

Title page, item (54) Title: delete "FOR STORAGE" and insert -- FOR DATA STORAGE --, therefor.

Specification

In column 1, under title, line 1, delete "FOR STORAGE" and insert -- FOR DATA STORAGE --, therefor.

In column 42, line 39, delete "MS" and insert -- JMS --, therefor.

In column 43, line 16, delete "MS" and insert -- JMS --, therefor.

In column 43, line 30, delete "MS" and insert -- JMS --, therefor.

Signed and Sealed this
Twenty-third Day of February, 2016

Michelle K. Lee
*Director of the United States Patent and Trademark Office*